(12) United States Patent
Takahira et al.

(10) Patent No.: US 11,813,869 B2
(45) Date of Patent: Nov. 14, 2023

(54) LIQUID DROPLET EJECTING APPARATUS

(71) Applicant: BROTHER KOGYO KABUSHIKI KAISHA, Nagoya (JP)

(72) Inventors: Yosuke Takahira, Nagoya (JP); Masaru Someya, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 14 days.

(21) Appl. No.: 17/731,311

(22) Filed: Apr. 28, 2022

(65) Prior Publication Data

US 2022/0348017 A1 Nov. 3, 2022

(30) Foreign Application Priority Data

Apr. 28, 2021 (JP) ................... 2021-075653

(51) Int. Cl.
  *B41J 29/393* (2006.01)
  *B41J 2/165* (2006.01)
(52) U.S. Cl.
  CPC ........... *B41J 2/1652* (2013.01); *B41J 29/393* (2013.01)
(58) Field of Classification Search
  CPC ................. B41J 29/393; B41J 2029/3935
  See application file for complete search history.

(56) References Cited

U.S. PATENT DOCUMENTS

| | | |
|---|---|---|
| 2019/0299673 A1 | 10/2019 | Mimoto et al. |
| 2021/0197579 A1* | 7/2021 | Nakajima ............ H04N 1/4078 |

FOREIGN PATENT DOCUMENTS

| | | |
|---|---|---|
| JP | 2010269573 A | 12/2010 |
| JP | 2013208836 A | 10/2013 |
| JP | 2015189181 A | 11/2015 |
| JP | 2016087980 A | 5/2016 |
| JP | 2019177556 A | 10/2019 |

* cited by examiner

*Primary Examiner* — Julian D Huffman
(74) *Attorney, Agent, or Firm* — Scully, Scott, Murphy & Presser, PC

(57) ABSTRACT

A liquid droplet ejecting apparatus comprises a liquid droplet ejecting head which has a nozzle array composed of a plurality of nozzles arranged in a first direction, a relative movement mechanism which relatively moves the liquid droplet ejecting head and a recording medium in the first direction, and a controller. The controller controls the liquid droplet ejecting head and the relative movement mechanism to record, on the recording medium, a nonuniformity correction pattern in order to correct any dispersion in a liquid droplet ejection amount among the plurality of nozzles. The controller is configured, in order to record the nonuniformity correction pattern, such that the liquid droplet ejecting head is allowed to eject liquid droplets from at least the first nozzle to thereby record a first pattern group, the relative movement mechanism is allowed to relatively move the liquid droplet ejecting head and the recording medium in the first direction by a predetermined distance, and the liquid droplet ejecting head is allowed to eject the liquid droplets from at least the second nozzle to thereby record a second pattern group.

19 Claims, 25 Drawing Sheets

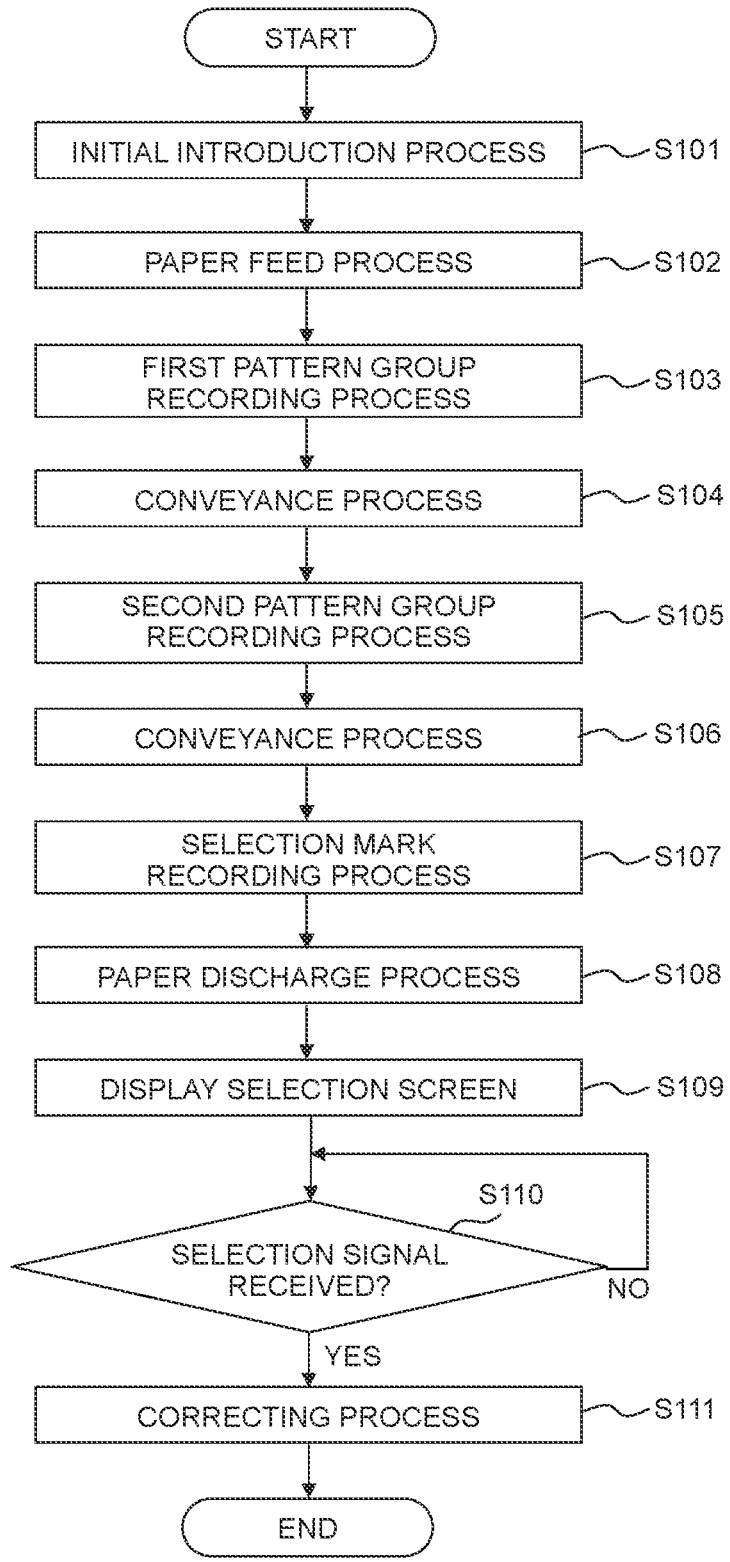

FIG. 7A

| FIRST PATTERN PORTION | 72A-72E | 72F | 72G | 72H | 72I |
|---|---|---|---|---|---|
| THINNING OUT RATE OF MASK DATA | 0 | M | 2×M | 3×M | 4×M |

FIG. 7B

| SECOND PATTERN PORTION | 82A | 82B | 82C | 82D | 82E-82I |
|---|---|---|---|---|---|
| THINNING OUT RATE OF MASK DATA | 4×M | 3×M | 2×M | M | 0 |

FIG. 7C

| SELECTION SIGNAL | A | B | C | D | E | F | G | H | I |
|---|---|---|---|---|---|---|---|---|---|
| CORRECTION AMOUNT | U-N -(4×R) | U-N -(3×R) | U-N -(2×R) | U-N -R | +0 | U-N -R | U-N -(2×R) | U-N -(3×R) | U-N -(4×R) |

FIG. 9A

| FIRST PATTERN PORTION | 72A-72E | 72F | 72G | 72H | 72I |
|---|---|---|---|---|---|
| THINNING OUT RATE OF MASK DATA | M1 | M1+[(1/4)xM] | M1+[(1/2)xM] | M1+[(3/4)xM] | M1+M |

FIG. 9B

| SECOND PATTERN PORTION | 82A | 82B | 82C | 82D | 82E-82I |
|---|---|---|---|---|---|
| THINNING OUT RATE OF MASK DATA | M2+M | M2+[(3/4)xM] | M2+[(1/2)xM] | M2+[(1/4)xM] | M2 |

FIG. 9C

| S211 \ S222 | A | B | C | D | E | F | G | H | I |
|---|---|---|---|---|---|---|---|---|---|
| A | D-N -5×R | D-N -{(4+(3/4))×R} | D-N -{(4+(1/2))×R} | D-N -{(4+(1/4))×R} | D-N -4×R | D-N -{(4-(1/4))×R} | D-N -{(4-(1/2))×R} | D-N -{(4-(3/4))×R} | D-N -3×R |
| B | D-N -4×R | D-N -{(3+(3/4))×R} | D-N -{(3+(1/2))×R} | D-N -{(3+(1/4))×R} | D-N -3×R | D-N -{(3-(1/4))×R} | D-N -{(3-(1/2))×R} | D-N -{(3-(3/4))×R} | D-N -2×R |
| C | D-N -3×R | D-N -{(2+(3/4))×R} | D-N -{(2+(1/2))×R} | D-N -{(2+(1/4))×R} | D-N -2×R | D-N -{(2-(1/4))×R} | D-N -{(2-(1/2))×R} | D-N -{(2-(3/4))×R} | D-N -1×R |
| D | D-N -2×R | D-N -{(1+(3/4))×R} | D-N -{(1+(1/2))×R} | D-N -{(1+(1/4))×R} | D-N -R | D-N -{(1-(1/4))×R} | D-N -{(1-(1/2))×R} | D-N -{(1-(3/4))×R} | ±0 |
| E | D-N -R | D-N -{(3/4)×R} | D-N -{(1/2)×R} | D-N -{(1/4)×R} | ±0 | U-N -{(1/4)×R} | U-N -{(1/2)×R} | U-N -{(3/4)×R} | U-N -1×R |
| F | ±0 | U-N -{(1-(3/4))×R} | U-N -{(1-(1/2))×R} | U-N -{(1-(1/4))×R} | U-N -R | U-N -{(1+(1/4))×R} | U-N -{(1+(1/2))×R} | U-N -{(1+(3/4))×R} | U-N -2×R |
| G | U-N -1×R | U-N -{(2-(3/4))×R} | U-N -{(2-(1/2))×R} | U-N -{(2-(1/4))×R} | U-N -2×R | U-N -{(2+(1/4))×R} | U-N -{(2+(1/2))×R} | U-N -{(2+(3/4))×R} | U-N -3×R |
| H | U-N -2×R | U-N -{(3-(3/4))×R} | U-N -{(3-(1/2))×R} | U-N -{(3-(1/4))×R} | U-N -3×R | U-N -{(3+(1/4))×R} | U-N -{(3+(1/2))×R} | U-N -{(3+(3/4))×R} | U-N -4×R |
| I | U-N -3×R | U-N -{(4-(3/4))×R} | U-N -{(4-(1/2))×R} | U-N -{(4-(1/4))×R} | U-N -4×R | U-N -{(4+(1/4))×R} | U-N -{(4+(1/2))×R} | U-N -{(4+(3/4))×R} | U-N -5×R |

FIG. 10A

| SELECTION SIGNAL | A | B | C | D | E | F | G | H | I |
|---|---|---|---|---|---|---|---|---|---|
| CORRECTION AMOUNT | U-N +(4×R) | U-N +(3×R) | U-N +(2×R) | U-N +R | ±0 | D-N +R | D-N +(2×R) | D-N +(3×R) | D-N +(4×R) |

FIG. 10B

| SELECTION SIGNAL | A | B | C | D | E | F | G | H | I |
|---|---|---|---|---|---|---|---|---|---|
| UPSTREAM NOZZLES CORRECTION AMOUNT | +R | +[(3/4)×R] | +[(1/2)×R] | +[(1/4)×R] | ±0 | -[(1/2)×R] | -R | -[(3/2)×R] | -(2×R) |
| DOWNSTREAM NOZZLES CORRECTION AMOUNT | -R | -[(3/4)×R] | -[(1/2)×R] | -[(1/4)×R] | ±0 | +[(1/2)×R] | +R | +[(3/2)×R] | +(2×R) |

FIG. 12A

| FIRST PATTERN PORTION | A - E | F | G | H | I |
|---|---|---|---|---|---|
| RATIO OF SMALL DROPLETS | 0 | R1 | R2(>R1) | R3(>R2) | R4(>R3) |

FIG. 12B

| SECOND PATTERN PORTION | A | B | C | D | E - I |
|---|---|---|---|---|---|
| RATIO OF SMALL DROPLETS | R4(>R3) | R3(>R2) | R2(>R1) | R1 | 0 |

FIG. 14A

| FIRST PATTERN PORTION | 112A-112E | 112F | 112G | 112H | 112I |
|---|---|---|---|---|---|
| THINNING OUT RATE OF MASK DATA | 4 × M | 3 × M | 2 × M | M | 0 |

FIG. 14B

| SECOND PATTERN PORTION | 122A | 122B | 122C | 122D | 122E-122I |
|---|---|---|---|---|---|
| THINNING OUT RATE OF MASK DATA | 0 | M | 2 × M | 3 × M | 4 × M |

FIG. 14C

| SELECTION SIGNAL | A | B | C | D | E | F | G | H | I |
|---|---|---|---|---|---|---|---|---|---|
| CORRECTION AMOUNT | D-N +(4 × R) | D-N +(3 × R) | D-N +(2 × R) | D-N +R | ±0 | U-N +R | U-N +(2 × R) | U-N +(3 × R) | U-N +(4 × R) |

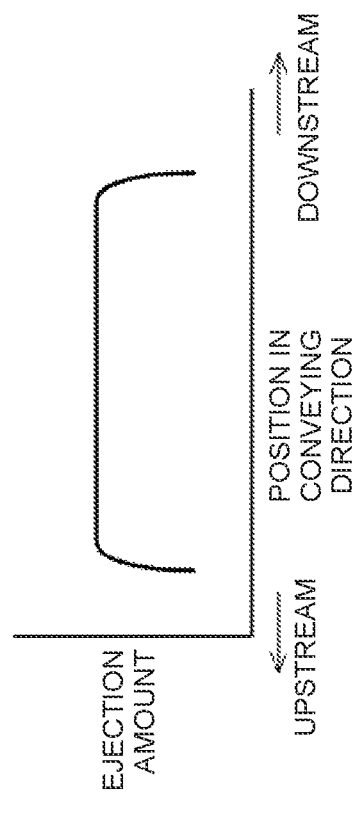
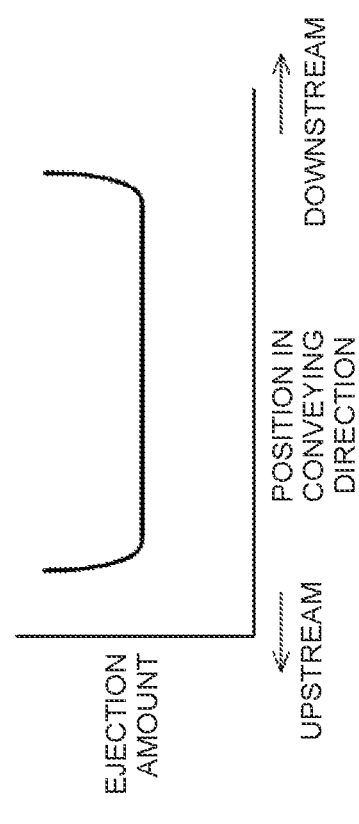
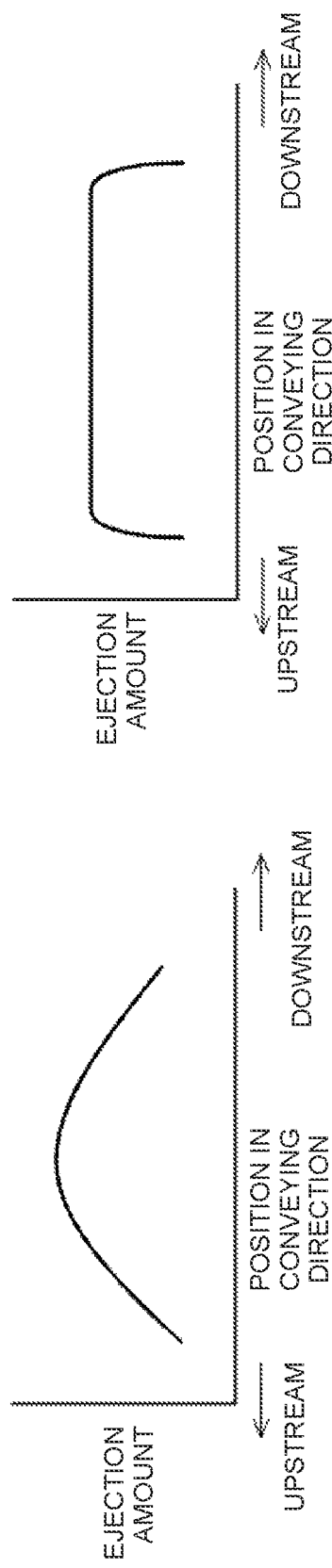
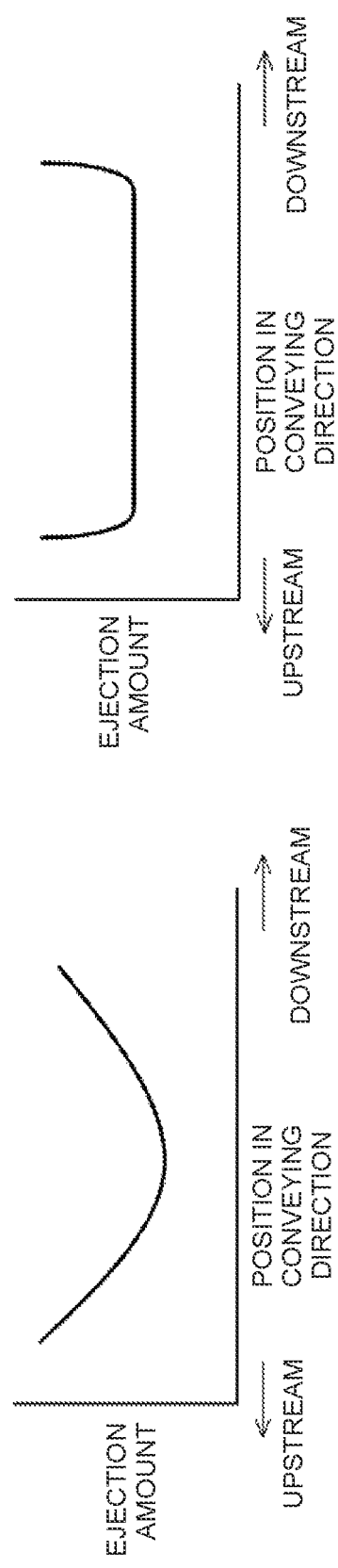

LIQUID DROPLET EJECTING APPARATUS

CROSS REFERENCE TO RELATED APPLICATIONS

The present application claims priority from Japanese Patent Application No. 2021-075653, filed on Apr. 28, 2021, the disclosure of which is incorporated herein by reference in its entirety.

BACKGROUND

The present invention relates to a liquid droplet ejecting apparatus for ejecting liquid droplets from nozzles.

An image recording apparatus, which performs recording by ejecting an ink from nozzles, is known as an example of the liquid droplet ejecting apparatus for ejecting the liquid droplets from the nozzles. In the case of the image recording apparatus, an ink-jet head is carried on a carriage. The ink-jet head has a plurality of nozzles which are aligned in the conveying direction. Then, the recording is performed on the recording paper by repeating the recording pass and the conveyance action. In the recording pass, the ink is ejected from the plurality of nozzles of the ink-jet head while moving the carriage in the scanning direction. Accordingly, dots are formed on the recording paper. In the conveyance action, the recording paper is conveyed in the conveying direction.

SUMMARY

In this context, in the case of the ink-jet head of the image recording apparatus described above, the ejection amount of the ink is dispersed in some cases among the plurality of nozzles, for example, due to the dispersion caused during the production of the ink-jet head. In such a situation, if the recording is performed by repeating the recording pass and the conveyance action as described above, it is feared that any density nonuniformity may appear in the conveying direction on the image to be recorded. Further, another image recording apparatus is known, which is provided with a so-called line head. In the case of the line head, a plurality of nozzles are arranged over the entire length of the recording paper in the direction orthogonal to the conveying direction of the recording paper, and the plurality of nozzles are arranged in the conveying direction of the recording paper. In the case of the image recording apparatus provided with the line head as described above, if the ejection amount of the ink is dispersed among the plurality of nozzles arranged in the conveying direction, it is also feared that the density nonuniformity may appear as described above.

An object of the present teaching is to provide a liquid droplet ejecting apparatus which makes it possible to easily correct the dispersion in the liquid droplet ejecting characteristic among a plurality of nozzles.

According to a first aspect of the present teaching, there is provided a liquid droplet ejecting apparatus including:
a liquid droplet ejecting head which has a nozzle array composed of a plurality of nozzles aligned in a first direction;
a relative movement mechanism which is configured to relatively move the liquid droplet ejecting head and a recording medium in the first direction; and
a controller,
wherein the controller is configured to record, on the recording medium, a nonuniformity correction pattern in order to correct any dispersion in liquid droplet ejection amount among the plurality of nozzles, by controlling the liquid droplet ejecting head and the relative movement mechanism,
in a case of recording the nonuniformity correction pattern, the controller is configured to:
control the liquid droplet ejecting head to eject liquid droplets from at least a first nozzle to thereby record a first pattern group which is composed of a plurality of first pattern portions aligned in a second direction intersecting with the first direction, the first nozzle being an outermost end nozzle disposed on one side in the first direction of the nozzle array, the first pattern group being a part of the nonuniformity correction pattern;
control the relative movement mechanism to relatively move the liquid droplet ejecting head and the recording medium in the first direction by a predetermined distance; and
control the liquid droplet ejecting head to eject the liquid droplets from at least a second nozzle to thereby record a second pattern group which is composed of a plurality of second pattern portions aligned in the second direction, the second nozzle being an outermost end nozzle disposed on the other side in the first direction of the nozzle array, the second pattern group being a part of the nonuniformity correction pattern,
portions, which are recorded by the second nozzle and included in the plurality of second pattern portions, are adjacent in the first direction to portions, which are recorded by the first nozzle and included in the plurality of first pattern portions,
the first pattern group includes a reference first pattern portion which is positioned between the first pattern portion disposed at an outermost end on one side in the second direction and the first pattern portion disposed at another outermost end on the other side in the second direction,
the second pattern group includes a reference second pattern portion which is positioned between the second pattern portion disposed at an outermost end on one side in the second direction and the second pattern portion disposed at another outermost end on the other side in the second direction, the reference second pattern portion being adjacent to the reference first pattern portion in the first direction,
in a case of recording the first pattern group, the controller is configured to control the liquid droplet ejecting head such that the first pattern portion disposed at the outermost end on one side in the second direction has a density which is thinned as compared with a density of the reference first pattern portion, and
in a case of recording the second pattern group, the controller is configured to control the liquid droplet ejecting head such that the second pattern portion disposed at the outermost end on the other side in the second direction has a density which is thinned as compared with a density of the reference second pattern portion.

According to a second aspect of the present teaching, there is provided a liquid droplet ejecting apparatus including:
a liquid droplet ejecting head which has a nozzle array composed of a plurality of nozzles aligned in a first direction;
a relative movement mechanism which is configured to relatively move the liquid droplet ejecting head and a recording medium in the first direction; and
a controller,
wherein the controller is configured to record, on the recording medium, a nonuniformity correction pattern in order to correct any dispersion in liquid droplet ejection amount among the plurality of nozzles, by controlling the liquid droplet ejecting head and the relative movement mechanism;

in a case of recording the nonuniformity correction pattern, the controller is configured to:
control the liquid droplet ejecting head to eject liquid droplets from at least a first nozzle to thereby record a first pattern group which is composed of a plurality of first pattern portions aligned in a second direction intersecting with the first direction, the first nozzle being an outermost end nozzle disposed on one side in the first direction of the nozzle array, the first pattern group being a part of the nonuniformity correction pattern;
control the relative movement mechanism to relatively move the liquid droplet ejecting head and the recording medium in the first direction by a predetermined distance; and
control the liquid droplet ejecting head to eject the liquid droplets from at least a second nozzle to thereby record a second pattern group which is composed of a plurality of second pattern portions aligned in the second direction, the second nozzle being an outermost end nozzle disposed on the other side in the first direction of the nozzle array, the second pattern group being a part of the nonuniformity correction pattern,
portions, which are recorded by the second nozzle and included in the plurality of second pattern portions, are adjacent in the first direction to portions, which are recorded by the first nozzle and included in the plurality of first pattern portions,
the first pattern group includes a reference first pattern portion which is positioned between the first pattern portion disposed at an outermost end on one side in the second direction and the first pattern portion disposed at another outermost end on the other side in the second direction,
the second pattern group includes a reference second pattern portion which is positioned between the second pattern portion disposed at an outermost end on one side in the second direction and the second pattern portion disposed at another outermost end on the other side in the second direction, the reference second pattern portion being adjacent to the reference first pattern portion in the first direction,
in a case of recording the first pattern group, the controller is configured to control the liquid droplet ejecting head such that the first pattern portion disposed at the outermost end on one side in the second direction has a density which is thickened as compared with a density of the reference first pattern portion, and
in a case of recording the second pattern group, the controller is configured to control the liquid droplet ejecting head such that the second pattern portion disposed at the outermost end on the other side in the second direction has a density which is thickened as compared with a density of the reference second pattern portion.

According to a third aspect of the present teaching, there is provided a liquid droplet ejecting apparatus including:
a liquid droplet ejecting head which has a plurality of nozzles aligned in a first direction;
a relative movement mechanism which is configured to relatively move the liquid droplet ejecting head and a recording medium in the first direction; and
a controller,
wherein the controller is configured to record, on the recording medium, a nonuniformity correction pattern in order to correct any dispersion in liquid droplet ejection amount among the plurality of nozzles, by controlling the liquid droplet ejecting head and the relative movement mechanism, the controller is configured to receive a characteristic signal which indicates whether the liquid droplet ejecting head has a first characteristic or a second characteristic different from the first characteristic, the first characteristic and the second characteristic being characteristics relevant to the dispersion in the liquid droplet ejection amount among the plurality of nozzles, and in a case of recording the nonuniformity correction pattern on the recording medium, the controller is configured to:
control the liquid droplet ejecting head and the relative movement mechanism to record a first nonuniformity correction pattern on the recording medium, if the received characteristic signal indicates that the liquid droplet ejecting head has the first characteristic; and
control the liquid droplet ejecting head and the relative movement mechanism to record a second nonuniformity correction pattern different from the first nonuniformity correction pattern on the recording medium, if the received characteristic signal indicates that the liquid droplet ejecting head has the second characteristic,
the first nonuniformity correction pattern is the nonuniformity correction pattern for correcting the dispersion in the liquid droplet ejection amount among the plurality of nozzles in relation to the liquid droplet ejecting head having the first characteristic; and
the second nonuniformity correction pattern is the nonuniformity correction pattern for correcting the dispersion in the liquid droplet ejection amount among the plurality of nozzles in relation to the liquid droplet ejecting head having the second characteristic.

According to the present teaching, it is possible to reduce the dispersion in the liquid droplet ejection amount among the nozzles on the basis of the recording result of the nonuniformity correction pattern.

BRIEF DESCRIPTION OF THE DRAWINGS

FIG. 5 is a flow chart illustrative of the flow of the process to be performed upon the initial startup.

FIG. 7A is a table illustrative of the thinning out rate of the mask data to be used for the recording of each of first pattern portions, FIG. 7B is a table illustrative of the thinning out rate of the mask data to be used for the recording of each of second pattern portions, and FIG. 7C is a table illustrative of the relationship between the selection signal and the correction amount of the ejection amount.

FIG. 9A is a table illustrative of the thinning out rate of the mask data to be used again for the recording of each of first pattern portions, FIG. 9B is a table illustrative of the thinning out rate of the mask data to be used again for the recording of each of second pattern portions, and FIG. 9C is a table illustrative of the relationship between the selection signal and the correction amount based on the nonuniformity correction patterns subjected to the process twice.

FIG. 10A is a table illustrative of the relationship between the selection signal and the correction amount of the ejection amount when the correction to increase the ejection amount is performed, and FIG. 10B is a table illustrative of the relationship between the selection signal and the correction amount of the ejection amount when both of the correction to decrease the ejection amount and the correction to increase the ejection amount are performed.

FIG. 12A is a table illustrative of the ratio of small droplets provided when each of the first pattern portions is recorded when the density is changed by changing the ratio of small droplets, and FIG. 12B is a table illustrative of the ratio of small droplets provided when each of the second pattern portions is recorded when the density is changed by changing the ratio of small droplets.

FIG. 14A is a table illustrative of the thinning out rate of the mask data to be used for the recording of each of the first pattern portions when the relationship concerning the density among the first pattern portions is reversed, FIG. 14B is a table illustrative of the thinning out rate of the mask data to be used for the recording of each of the second pattern portions when the relationship concerning the density among the first pattern portions is reversed, and FIG. 14C is a table illustrative of the relationship between the selection signal and the correction amount of the ejection amount when the relationship concerning the density among the first pattern portions is reversed.

FIG. 16A is a drawing illustrative of an exemplary second characteristic, FIG. 16B is a drawing illustrative of another exemplary second characteristic, FIG. 16C is a drawing illustrative of still another exemplary second characteristic, and FIG. 16D is a drawing illustrative of still another exemplary second characteristic.

DETAILED DESCRIPTION

An embodiment of the present teaching will be explained below.

<Overall Configuration of Printer>

Figure 1:
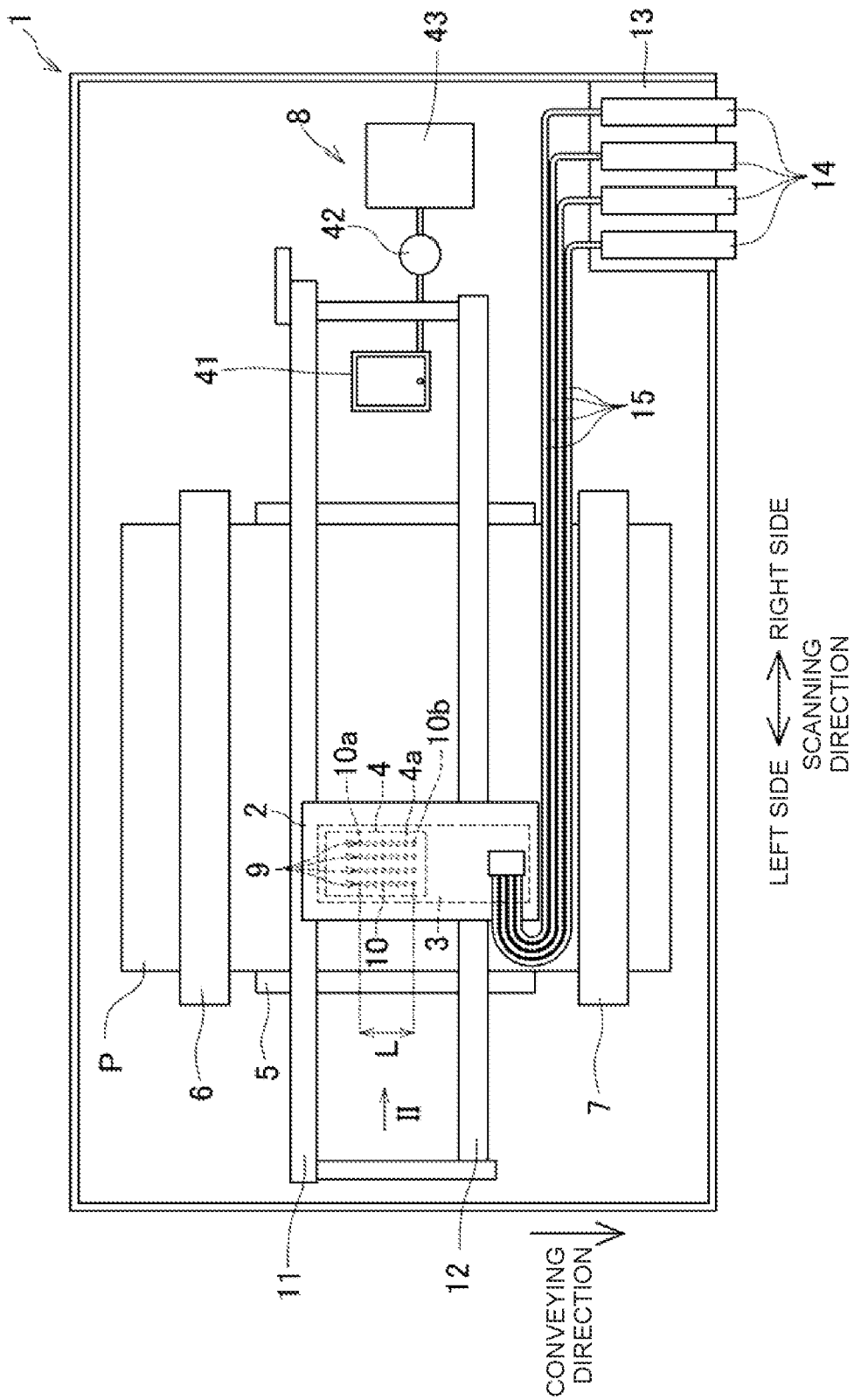
FIG. 1 is a view illustrative of schematic configuration of a printer according to an embodiment of the present teaching.

As depicted in FIG. 1, a printer 1 according to the embodiment of the present teaching ("liquid droplet ejecting apparatus" of the present teaching) is provided with, for example, a carriage 2, a subtank 3, an ink-jet head ("liquid droplet ejecting head" of the present teaching), a platen 5, conveying rollers 6, 7 ("relative movement mechanism" of the present teaching), and a maintenance unit 8 ("purge mechanism" of the present teaching).

The carriage 2 is supported by two guide rails 11, 12 which extend in the scanning direction ("second direction" of the present teaching). The carriage 2 is connected to a carriage motor 56 (see FIG. 3), for example, via an unillustrated belt. When the carriage motor 56 is driven, the carriage 2 is moved in the scanning direction along the guide rails 11, 12. The following explanation will be made, while the right side and the left side in the scanning direction are defined as depicted in FIG. 1.

The subtank 3 is carried on the carriage 2. In this arrangement, the printer 1 is provided with a cartridge holder 13. Four ink cartridges 14 ("liquid tanks" of the present teaching) are removably installed to the cartridge holder 13. The four ink cartridges 14 are aligned in the scanning direction. Black, yellow, cyan, and magenta inks are stored in the four ink cartridges 14 in an order starting from the ink cartridge 14 arranged on the right side in the scanning direction. The subtank 3 is connected to the four ink cartridges 14 installed to the cartridge holder 13 via four tubes 15. Accordingly, the four color inks are supplied from the four ink cartridges 14 to the subtank 3. Note that ink tanks, which are fixed to the casing of the printer 1, may be provided in place of the ink cartridges 14.

The ink-jet head 4 is carried on the carriage 2, and the ink-jet head 4 is connected to the lower end portion of the subtank 3. The four color inks described above are supplied from the subtank 3 to the ink-jet head 4. Further, a plurality of nozzles 10 are formed on the nozzle surface 4a which is the lower surface of the ink-jet head 4. The ink-jet head 4 ejects ink droplets ("liquid droplets" of the present teaching) from the plurality of nozzles 10. This arrangement will be explained in more detail below. The plurality of nozzles 10 form four nozzle arrays 9 which are aligned in the scanning direction on the nozzle surface 4. Each of the nozzle arrays 9 is formed by the plurality of nozzles 10 which are arranged over the length L in the conveying direction ("first direction"

of the present teaching) orthogonal to the scanning direction. The ink droplets of black, yellow, cyan, and magenta are ejected from the nozzle arrays 9 respectively as referred to in an order starting from the nozzle array 10 disposed on the right side in the scanning direction.

The platen 5 is arranged under or below the ink-jet head 4, and the platen 5 is opposed to the plurality of nozzles 10. The platen 5 extends in the scanning direction over the entire length of the recording paper P (example of the "recording medium" of the present teaching), and the platen 5 supports the recording paper P at the lower position.

The conveying roller 6 ("first conveying roller" of the present teaching) is arranged on the upstream side in the conveying direction from the ink-jet head 4 and the platen 5. The conveying roller 7 ("second conveying roller" of the present teaching) is arranged on the downstream side in the conveying direction from the ink-jet head 4 and the platen 5. That is, the conveying roller 6 and the conveying roller 7 are arranged separately in the conveying direction. The ink-jet head 4 is positioned between the conveying roller 6 and the conveying roller 7 in the conveying direction.

Figure 2:
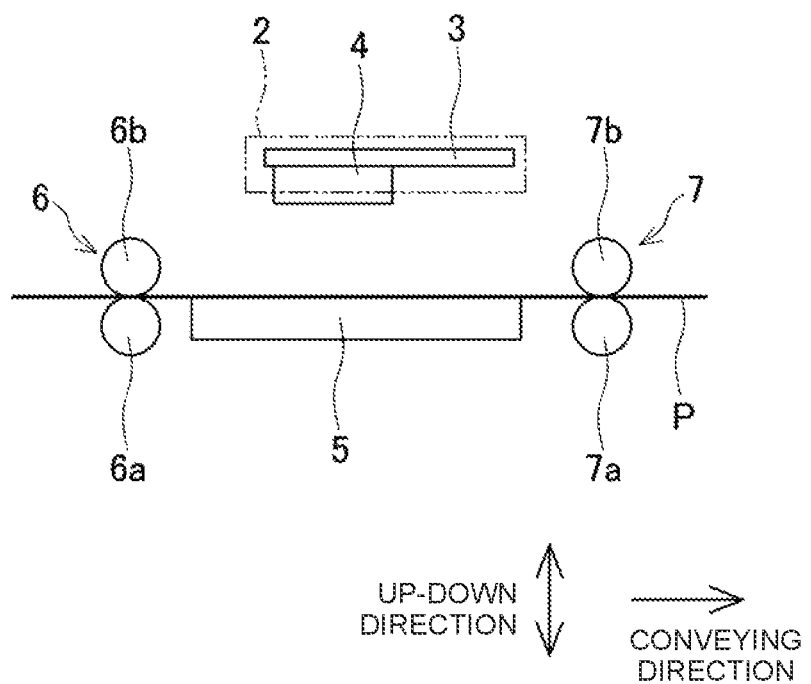
FIG. 2 is a view illustrative of the positional relationship among a carriage, a subtank, an ink-jet head, a platen, and a conveying roller as viewed in a direction of an arrow II depicted in FIG. 1.

As depicted in FIG. 2, the conveying roller 6 is configured by a driving roller 6a and a driven roller 6b. The recording paper P is interposed in the upward-downward direction by the driving roller 6a and the driven roller 6b. The conveying roller 7 is configured by a driving roller 7a and a driven roller 7b. The recording paper P is interposed in the upward-downward direction by the driving roller 7a and the driven roller 7b. Further, the driving rollers 6a, 7a are connected to a conveyance motor 57 (see FIG. 3), for example, via unillustrated gears. When the conveyance motor 57 is driven, then the driving rollers 6a, 7a are rotated, and the driven rollers 6b, 7b are driven and rotated in accordance therewith. Accordingly, the recording paper P, which is interposed by the driving roller 6a and the driven roller 6b and by the driving roller 7a and the driven roller 7b, is conveyed in the conveying direction.

The maintenance unit 8 is provided with a cap 41, a suction pump 42, and a waste liquid tank 43. The cap 41 is arranged on the right side in the scanning direction as compared with the platen 5. Then, when the carriage 2 is positioned at the maintenance position disposed on the right side in the scanning direction as compared with the platen 5, the plurality of nozzles 10 are opposed to the cap 41.

Figure 3:
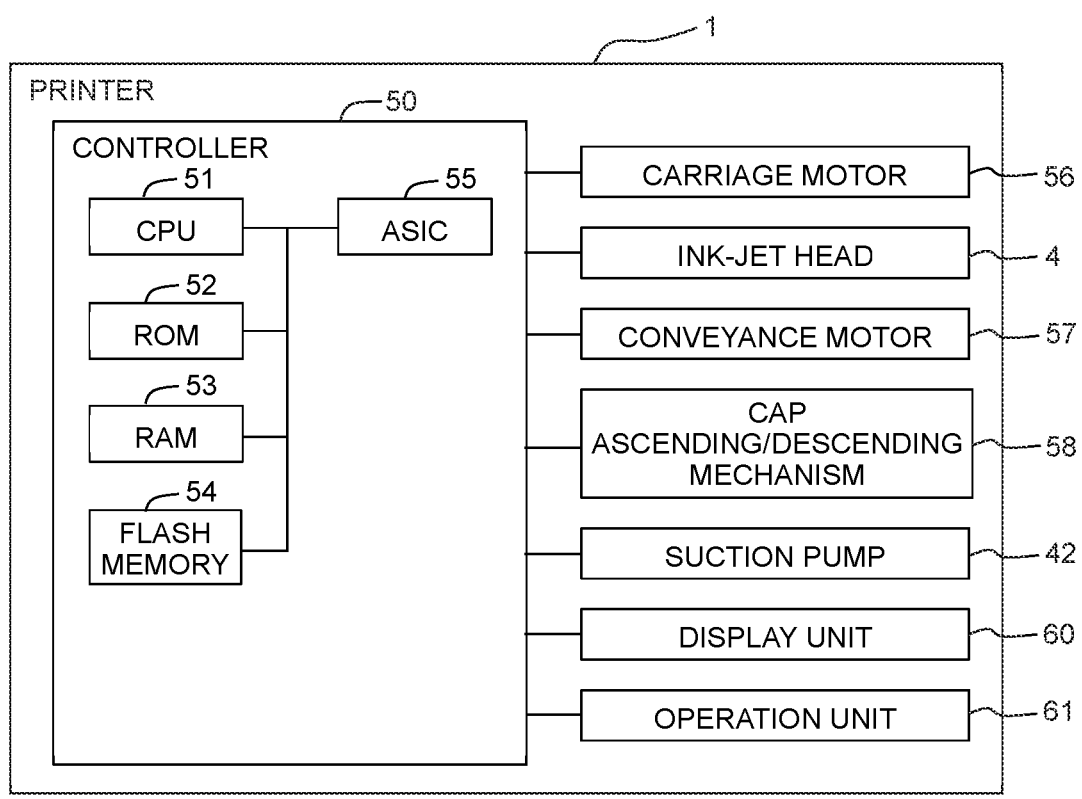
FIG. 3 is a block diagram illustrative of the electric configuration of the printer.

Further, the cap 41 is configured to be capable of ascending/descending by means of a cap ascending/descending mechanism 58 (see FIG. 3). Then, when the cap 41 is moved upwardly by the cap ascending/descending mechanism 58 in a state in which the plurality of nozzles 10 are opposed to the cap 41 at the maintenance position as described above, the upper end portion of the cap 41 is brought in tight contact with the nozzle surface 4a. Accordingly, the plurality of nozzles 10 are covered with the cap 41. Note that it is not necessarily indispensable that the cap 41 covers the plurality of nozzles 10 by being brought in tight contact with the nozzle surface 4a. For example, the cap 41 may cover the plurality of nozzles 10 by being brought in tight contact with, for example, an unillustrated frame which is arranged around the nozzle surface 4a of the ink-jet head 4.

The suction pump 42 is, for example, a tube pump. The suction pump 42 is connected to the cap 41 and the waste liquid tank 43. Then, with the maintenance unit 8, it is possible to perform the so-called suction purge. In the suction purge, the suction pump 42 is driven in the state in which the plurality of nozzles 10 are covered with the cap 41 as described above, and the inks contained in the ink-jet head 4 are discharged from the plurality of nozzles 10. The inks, which are discharged by the suction purge, are stored in the waste liquid tank 43.

Note that in this case, the explanation has been made for the purpose of convenience assuming that the cap 41 collectively covers all of the nozzles 10, and the inks contained in the ink-jet head 4 are discharged from all of the nozzles 10 during the suction purge. However, there is no limitation thereto. For example, the cap 41 may be separately provided with a portion which covers the nozzle array 9 disposed on the rightmost side for ejecting the black ink, and a portion which covers the three nozzle arrays 9 disposed on the left side for ejecting the color inks (inks of yellow, cyan, and magenta). Then, in the suction purge, any one of the black ink and the color inks contained in the ink-jet head 4 may be selectively discharged. Alternatively, for example, the cap 41 may be provided individually for each of the nozzle arrays 9. Then, in the suction purge, the ink may be discharged from each of the nozzle arrays 9.

<Electric Configuration of Printer>

Next, the electric configuration of the printer 1 will be explained. As depicted in FIG. 3, the printer 1 is provided with a controller 50. The controller 50 is composed of, for example, CPU (Central Processing Unit) 51, ROM (Read Only Memory) 52, RAM (Random Access Memory) 53, a flash memory 54, and ASIC (Application Specific Integrated Circuit) 55. The controller 50 controls the actions of, for example, the carriage motor 56, the ink-jet head 4, the conveyance motor 57, the cap ascending/descending mechanism 58, and the suction pump 42.

The printer 1 is further provided with a display unit 60 and an operation unit 61 ("input unit" of the present teaching) in addition to the components explained above. The display unit 60 is, for example, a liquid crystal display provided for the casing of the printer 1. The controller 50 controls the display unit 60 to display, for example, the information required for the action or operation of the printer 1. The operation unit 61 is, for example, buttons which are provided for the casing of the printer 1 and a touch panel which is provided for the display unit 60. The user can input the signal by operating the operation unit 61, and the controller 50 receives the inputted signal.

Note that as for the controller 50, only CPU 51 may perform various processes. Alternatively, only ASIC 55 may perform various processes. Further alternatively, CPU 51 and ASIC 55 may perform various processes in a cooperated manner. Further, as for the controller 50, one CPU 51 may perform the processes independently. Alternatively, a plurality of CPUs 51 may perform the processes in a shared manner. Further, as for the controller 50, one ASIC 55 may perform the processes independently. Alternatively, a plurality of ASICs 55 may perform the processes in a shared manner.

<Process Upon Initial Startup>

Next, an explanation will be made about the process of the controller 50 upon the initial startup of the printer 1. In this case, when the printer 1 is produced, the ink-jet head 4 is filled with a preserving liquid in place of the inks. The preserving liquid is, for example, a liquid in which the coloring agent is removed from the ink.

Further, in the ink-jet head 4, the dispersion appears in some cases in the ink droplet ejection amount among the plurality of nozzles 10 for constructing the nozzle arrays 9, for example, due to the influence of any error brought about during the production. The dispersion in the ink droplet ejection amount refers to the occurrence of the difference in the ink droplet ejection amount among the plurality of nozzles 10 when the ink-jet head 4 is driven by using an identical signal.

Figure 4A:
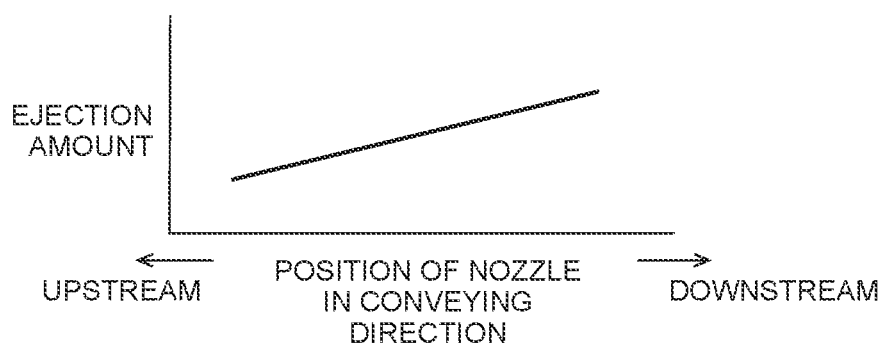
FIG. 4A is a graph illustrative of an exemplary characteristic of the ink-jet head.

For example, the ink-jet head 4 has the characteristic as depicted in FIG. 4A in some cases. That is, when the ink-jet head 4 is driven with the same signal, and the ink droplets are ejected from the plurality of nozzles 10 for constructing one nozzle array 9, then the ejection amount of the ink droplets is gradually increased in the direction directed from the nozzle 10a positioned most upstream in the conveying direction ("first nozzle disposed at one outermost end in the first direction" of the present teaching) to the nozzle 10b positioned most downstream ("second nozzle disposed at the other outermost end in the first direction" of the present teaching).

Figure 4B:
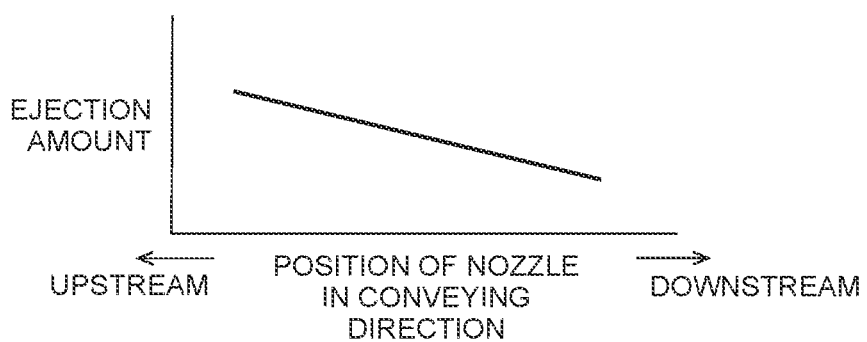
FIG. 4B is a graph illustrative of another exemplary characteristic of the ink-jet head.

Alternatively, the ink-jet head 4 has the characteristic as depicted in FIG. 4B in other cases. That is, when the ink-jet head 4 is driven with the same signal, and the ink droplets are ejected from the plurality of nozzles 10 for constructing one nozzle array 9, then the ejection amount of the ink droplets is gradually decreased in the direction directed from the nozzle 10a to the nozzle 10b.

In view of the above, in this embodiment, the controller 50 performs the process in accordance with the flow depicted in FIG. 5 upon the initial use of the printer 1. Accordingly, the initial introduction is performed, in which the preserving liquid contained in the ink-jet head 4 is discharged and the inks are introduced into the ink-jet head 4. Further, the ejection amount of the ink droplets from the nozzle 10 is corrected.

In accordance with the flow depicted in FIG. 5, the controller 50 executes the initial introduction process (S101) in the first place. In the initial introduction process, the controller 50 controls, for example, the suction pump 42 to perform the suction purge. Accordingly, the preserving liquid contained in the ink-jet head 4 is discharged, and the inks are introduced from the ink cartridge 14 into the ink-jet head 4.

Subsequently, the controller 50 executes the paper feed process (S102). In the paper feed process, the controller 50 controls an unillustrated paper feed mechanism to pick up the recording paper P. Further, the controller 50 controls the conveyance motor 57 so that the conveying rollers 6, 7 convey the recording paper P. As a result, the recording paper P is conveyed to the position at which the recording paper P is interposed by both of the conveying rollers 6, 7 as depicted in FIG. 1 and FIG. 2.

Figure 6A:
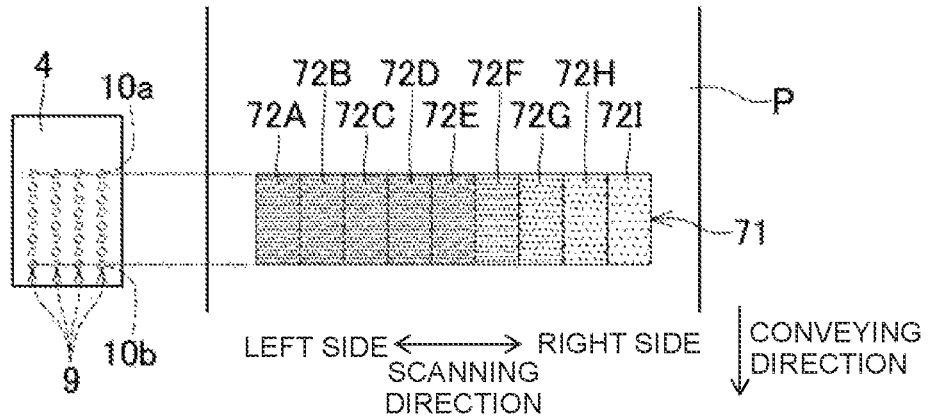
FIG. 6A is a drawing illustrative of the recording of a first pattern group.

Subsequently, the controller 50 executes the first pattern group recording process (S103). In the first pattern group recording process, the controller 50 allows the carriage 2 and the ink-jet head 4 to perform the recording pass, and thus the first pattern group 71 as depicted in FIG. 6A is recorded on the recording paper P. In the recording pass, the controller 50 controls the carriage motor 56 so that the carriage 2 is moved in the scanning direction, while the controller 50 controls the ink-jet head 4 so that the ink droplets are ejected from the plurality of nozzles 10. Note that the first pattern groups 71 are recorded respectively for the inks of black, yellow, cyan, and magenta. However, the first pattern groups 71 are the same except for the colors of the inks. On this account, the explanation is made by illustrating only the first pattern group 71 corresponding to one color in FIG. 6A. For example, the pattern groups other than the first pattern groups 71 and the nonuniformity correction patterns, which are referred to in the following explanation, are dealt with in the same manner as described above.

The first pattern group 71 is composed of a plurality of first pattern portions 72A to 72I which are aligned adjacently in the scanning direction. The first pattern portions 72A to 72I are rectangular fill patterns. Note that the first pattern portion 72E, which is included in the first pattern portions 72A to 72I and which is positioned at the center in the scanning direction, corresponds to the "reference first pattern portion" of the present teaching. Further, the first pattern portion 72I, which is positioned at the right end, corresponds to the "first pattern portion disposed at the outermost end on one side in the second direction" of the present teaching. Further, the first pattern portion 72A, which is positioned at the left end, corresponds to the "first pattern portion disposed at the outermost end on the other side in the second direction" of the present teaching.

Further, in the first pattern group recording process, the controller 50 allows all of the nozzles 10 for constructing the nozzle array 9 to eject the ink droplets therefrom. Thus, the first pattern portions 72A to 72I are recorded on the recording paper P.

Further, in the first pattern group recording process, the controller 50 allows the nozzles 10 to record the first pattern portions 72A to 72D so that the first pattern portion 72E and the first pattern portions 72A to 72D disposed on the left side from the first pattern portion 72E (having far distances from the first pattern portion 72I) have the same density. Further, the controller 50 allows the nozzles 10 to record the first pattern portions 72F to 72I so that the first pattern portions 72F to 72I disposed on the right side from the first pattern portion 72E (having far distances from the first pattern portion 72A) have densities thinner than that of the first pattern portion 72E, and the densities are more thinned at the first pattern portions disposed nearer to the right end.

With reference to FIG. 5 again, the controller 50 subsequently executes the conveyance process (S104). In the conveyance process of S104, the controller 50 controls the conveyance motor 57 so that the conveying rollers 6, 7 convey the recording paper P in the conveying direction by the length L of the nozzle array 9. In this procedure, in this embodiment, the conveying rollers 6, 7 convey the recording paper P in S102 so that the recording paper P is also positioned at the position at which the recording paper P is interposed by both of the conveying rollers 6, 7 after the conveyance process of S104.

Figure 6B:
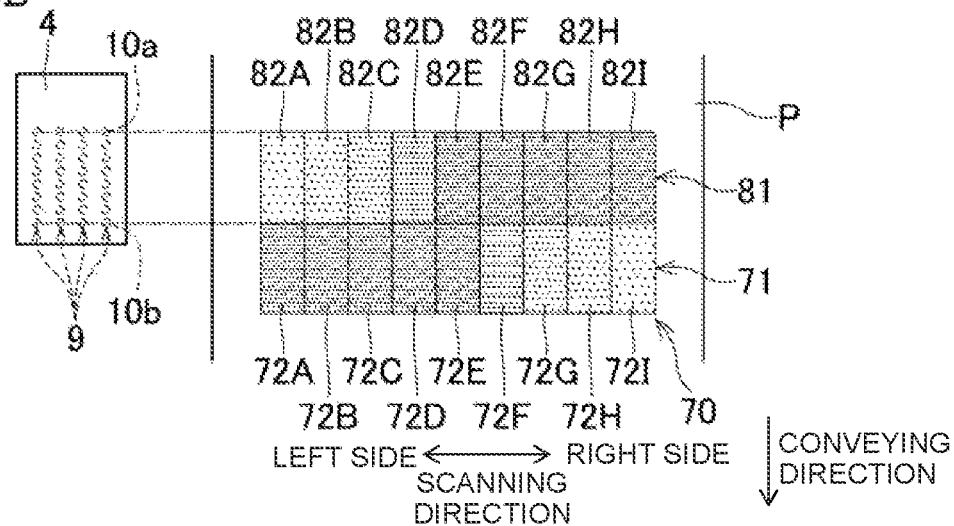
FIG. 6B is a drawing illustrative of the recording of a second pattern group.

Subsequently, the controller 50 executes the second pattern group recording process (S105). In the second pattern group recording process, the controller 50 performs the recording pass, and thus the second pattern group 81 as depicted in FIG. 6B is recorded on the recording paper P.

The second pattern group 81 is composed of a plurality of second pattern portions 82A to 82I which are aligned adjacently in the scanning direction. The second pattern portions 82A to 82I are rectangular fill patterns. Further, the second pattern portions 82A to 82I are aligned adjacently to the first pattern portions 72A to 72I respectively on the upstream side in the conveying direction. Accordingly, the portions, which are recorded by the nozzles 10a for the first pattern portions 72A to 72I, are adjacent in the conveying direction to the portions which are recorded by the nozzles 10b for the second pattern portions 82A to 82I.

Note that in this embodiment, the second pattern portion 82E, which is included in the second pattern portions 82A to 82I and which is positioned at the center in the scanning direction, corresponds to the "reference second pattern portion" of the present teaching. Further, the second pattern portion 82I, which is positioned at the right end, corresponds to the "second pattern portion disposed at the outermost end on one side in the second direction" of the present teaching. Further, the second pattern portion 82A, which is positioned at the left end, corresponds to the "second pattern portion disposed at the outermost end on the other side in the second direction" of the present teaching.

Further, in the second pattern group recording process, the controller 50 allows, in the recording pass, all of the nozzles 10 for constructing the nozzle array 9 to eject the ink droplets therefrom. Thus, the second pattern portions 82A to 82I are recorded on the recording paper P.

Further, in the second pattern group recording process, the controller 50 allows the nozzles 10 to record the second pattern portions 82E to 82I so that the second pattern portion 82E and the second pattern portions 82F to 82I disposed on the right side therefrom (having far distances from the second pattern portion 82A) have the same density.

Further, assuming that there is no dispersion in the ink droplet ejection amount among the plurality of nozzles 10 for constructing the nozzle array 9, the controller 50 allows the nozzles 10 to record the second pattern portions 82E to 82I so that the densities of the second pattern portions 82E to 82-E 82I are the same as the densities of the first pattern portions 72A to 72E. Further, the controller 50 allows the nozzles 10 to record the second pattern portions 82A to 82D so that the second pattern portions 82A to 82D disposed on the left side from the second pattern portion 82E (having far distances from the second pattern portion 82I) have densities thinner than that of the second pattern portion 82E, and the densities are more thinned at the second pattern portions disposed nearer to the left end.

Then, in this embodiment, the nonuniformity correction pattern 70, which has the first pattern group 71 and the second pattern group 81, is recorded as described above.

An explanation will now be made about a method in which the recording is performed so that the first pattern portions 72A to 72I and the second pattern portions 82A to 82I have the densities as described above. In this embodiment, when the ink droplets are ejected from the plurality of nozzles 10 in the recording pass, the controller 50 generates the ejection data which indicates the ejection timing of the ink droplets to be ejected from the respective nozzles 10 in the recording pass on the basis of the image data of the image to be recorded. Further, the controller 50 can decrease the ejection amount of the ink droplets per unit area of the first pattern portion so that the density is thinned by ejecting the ink droplets from the plurality of nozzles 10 while thinning out some of the ejections of the ink droplets indicated by the ejection data on the basis of the mask data.

Further, in this procedure, the controller 50 can thin out some of the ejections of the ink droplets indicated by the ejection data by selectively using any one of the plurality of types of mask data in which the thinning out rate differs. The thinning out rate is the rate of the ejections of the ink droplets to be thinned out, of the ejections of the ink droplets indicated by the ejection data. Further, the plurality of types of mask data are prepared by the controller 50 by itself, or the plurality of types of mask data are previously stored in the flash memory 54.

Then, as depicted in FIG. 7A and FIG. 7B, when the first pattern portions 72A to 72E and the second pattern portions 82E to 82I are recorded, the mask data, in which the thinning out rate is zero, is used. That is, the first pattern portions 72A to 72E and the second pattern portions 82E to 82I are recorded without thinning out the ejections of the ink droplets from the plurality of nozzles 10.

Further, as depicted in FIG. 7A, when the first pattern portions 72F, 72G, 72H, 72I are recorded, the mask data, in which the thinning out rates are M, (2×M), (3×M), and (4×M) respectively, are used. That is, the first pattern portions 72F to 72I are recorded by using the mask data in which the thinning out rates are higher for the first pattern portions disposed nearer to the right end.

Further, as depicted in FIG. 7B, when the second pattern portions 82A, 82B, 82C, 82D are recorded, the mask data, in which the thinning out rates are (4×M), (3×M), (2×M), and M respectively, are used. That is, the second pattern portions 82A to 82D are recorded by using the mask data in which the thinning out rates are higher for the second pattern portions disposed nearer to the left end.

Subsequently, the controller 50 executes the conveyance process (S106). In the conveyance process of S106, the controller 50 controls the conveyance motor 57 to allow the conveying rollers 6, 7 to convey the recording paper P. The conveyance amount of the recording paper P, which is provided in this procedure, may be the same as the length L of the nozzle array 9 or different from the length L.

Figure 6C:
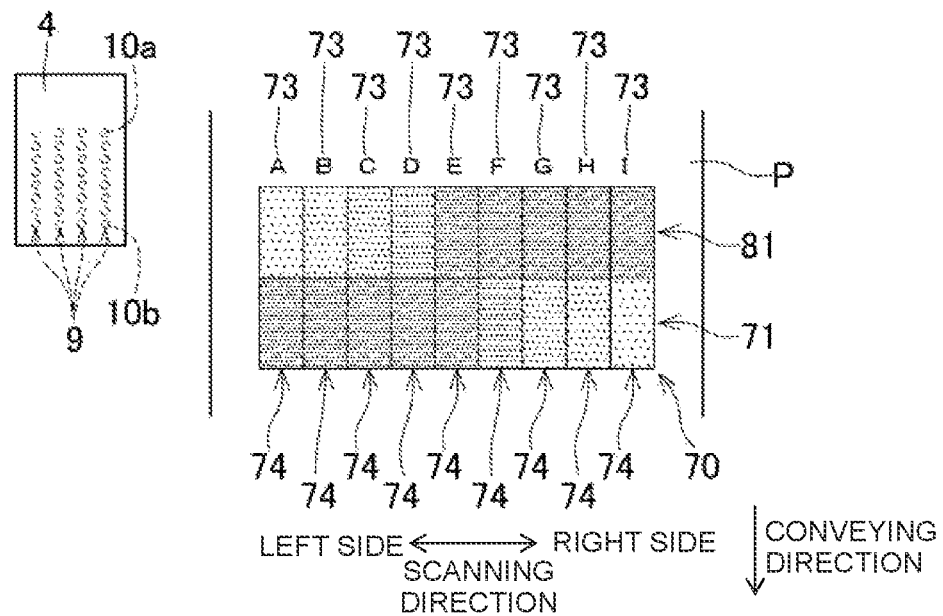
FIG. 6C is a drawing illustrative of the recording of selection marks.

Subsequently, the controller 50 executes the selection mark recording process (S107). In the selection mark recording process, the controller 50 operates to record a plurality of selection marks 73 by performing the recording pass in order to allow the user to select any one of pattern sets 74 each of which is the set of the first pattern portion and the second pattern portion aligned in the conveying direction as depicted in FIG. 6C.

Subsequently, the controller 50 executes the paper discharge process (S108). In the paper discharge process, the controller 50 controls the conveyance motor 57 to discharge the recording paper P by allowing the conveying rollers 6, 7 to convey the recording paper P.

Subsequently, the controller 50 allows the display unit 60 to display the selection screen in order to allow the user to select the pattern set 74 which has the smallest density difference at the boundary between the first pattern portion and the second pattern portion (S109). Then, the selection signal for selecting the pattern set 74 is inputted in accordance with the operation of the operation unit 61 performed by the user, and the controller 50 waits until the controller 50 receives the selection signal (S110: NO). Note that in this embodiment, the information of the position in the scanning direction of the pattern set 74 indicated by the selection signal corresponds to the "information of the density optimum position" of the present teaching.

Then, the controller 50 executes the correcting process (S111) if the controller 50 receives the selection signal (S110: YES). In the correcting process, the controller 50 corrects the ink droplet ejection amount ejected from the nozzles 10 on the basis of the selection signal. The correction of the ink droplet ejection amount ejected from the nozzles 10 is performed, for example, by correcting the waveform of the driving signal for driving the ink-jet head 4.

The correction of the ink droplet ejection amount will be explained in detail below. As depicted in FIG. 7C, if the selection signal indicates the pattern set 74 of the first pattern portion 72E and the second pattern portion 82E (if "E" is selected), then the ink droplet ejection amount ejected from the nozzles 10 is not corrected (correction amount is ±0).

Further, if the selection signal indicates the pattern set 74 disposed on the left side as compared with the pattern set 74 of the first pattern portion 72E and the second pattern portion 82E (if any one of "A" to "D" is selected), then the correction is performed to decrease the ink droplet ejection amount(s) ejected from the nozzle 10b or a predetermined number of nozzles 10 including the nozzle 10b and aligned continuously (they are hereinafter collectively referred to as "downstream nozzles" in some cases). Further, in this procedure, the correction is performed to decrease the ink droplet ejection amounts from the downstream nozzles for the pattern sets 74 included in the pattern sets 74 indicated by the selection signals and disposed nearer to the left end. Note that "−" in FIG. 7C means that the ejection amount is decreased.

Further, the ink droplet ejection amounts ejected from the downstream nozzles after the correction by the correction amounts of "A" to "D" depicted in FIG. 7C are the same as the ink droplet ejection amounts ejected from the downstream nozzles provided when the second pattern portions 82A to 82D are recorded respectively.

Further, if the selection signal indicates the pattern set 74 disposed on the right side as compared with the pattern set 74 of the first pattern portion 72E and the second pattern portion 82E (if any one of "F" to "I" is selected), then the correction is performed to decrease the ink droplet ejection amount(s) ejected from the nozzle 10a or a predetermined number of nozzles 10 including the nozzle 10a and aligned continuously (they are hereinafter collectively referred to as "upstream nozzles" in some cases). Further, in this procedure, the correction is performed to decrease the ink droplet ejection amounts from the upstream nozzles for the pattern sets 74 included in the pattern sets 74 indicated by the selection signals and disposed nearer to the right end.

Further, the ink droplet ejection amounts ejected from the upstream nozzles after the correction by the correction amounts of "F" to "I" depicted in FIG. 7C are the same as the ink droplet ejection amounts ejected from the upstream nozzles provided when the first pattern portions 72F to 72I are recorded respectively.

<Effect>

In this embodiment, the first pattern portions 72A to 72E have the same density, and the first pattern portions 72F to 72I have the densities which are thinner than those of the first pattern portions 72A to 72E. Further, as for the first pattern portions 72F to 72I, the densities are thinner at the first pattern portions disposed nearer to the right end. Further, the second pattern portions 82E to 82I have the same density, and the second pattern portions 82A to 82D have the densities which are thinner than those of the second pattern portions 82E to 82I. Further, as for the second pattern portions 82A to 82D, the densities are thinner at the second pattern portions disposed nearer to the left end.

Therefore, on condition that if there is no difference in the ejection amount between the nozzle 10a and the nozzle 10b, the smallest density difference is provided at the boundary between the first pattern portion and the second pattern portion in relation to the pattern set 74 of the first pattern portion 72E and the second pattern portion 82E. On the other hand, if the ink droplet ejection amount ejected from the nozzle 10b is larger than the ink droplet ejection amount ejected from the nozzle 10a, the smallest density difference is provided at the boundary between the first pattern portion and the second pattern portion in relation to the pattern set 74 disposed on the left side from the pattern set 74 of the first pattern portion 72E and the second pattern portion 82E. Further, if the ink droplet ejection amount ejected from the nozzle 10b is smaller than the ink droplet ejection amount ejected from the nozzle 10a, the smallest density difference is provided at the boundary between the first pattern portion and the second pattern portion in relation to the pattern set 74 disposed on the right side from the pattern set 74 of the first pattern portion 72E and the second pattern portion 82E.

Therefore, the ink droplet ejection amount from the upstream nozzle or the downstream nozzle is set to the ejection amount provided upon the recording of the pattern set 74 in which the smallest density difference is provided at the boundary between the first pattern portion and the second pattern portion, and thus it is possible to reduce the dispersion in the ink droplet ejection amount among the nozzles 10.

Further, in this embodiment, the user is allowed to merely select the pattern set 74 in which the smallest density difference is provided at the boundary portion between the first pattern portion and the second pattern portion. Accordingly, the ink droplet ejection amount ejected from the nozzles 10 is corrected in accordance with the selection result, and it is possible to reduce the dispersion in the ink droplet ejection amount among the nozzles 10. Therefore, in this embodiment, it is unnecessary to use, for example, a scanner for reading the nonuniformity correction pattern to acquire the information about the density. It is possible to easily reduce the dispersion in the ink droplet ejection amount ejected from the nozzles 10.

Further, in this embodiment, the first pattern group 71 has the plurality of first pattern portions 72A to 72D and the plurality of first pattern portions 72F to 72I which are disposed on the left side and the right side from the first pattern portion 72E respectively. That is, the first pattern group 71 has the first pattern portions 72B to 72D between the first pattern portion 72A and the first pattern portion 72E, and the first pattern group 71 has the first pattern portions 72F to 72H between the first pattern portion 72E and the first pattern portion 72I.

Similarly, the second pattern group 81 has the plurality of second pattern portions 82A to 82D and the plurality of second pattern portions 82F to 82I which are disposed on the left side and the right side from the second pattern portion 82E respectively. That is, the second pattern group 81 has the second pattern portions 82B to 82D between the second pattern portion 82A and the second pattern portion 82E, and the second pattern group 81 has the second pattern portions 82F to 82H between the second pattern portion 82E and the second pattern portion 82I.

According to the fact as described above, in this embodiment, the first pattern group 71 has the plurality of first pattern portions 72F to 72I in which the density is changed in the multiple stages with respect to the first pattern portion 72E, and the second pattern group 81 has the plurality of second pattern portions 82A to 82D in which the density is changed in the multiple stages with respect to the second pattern portion 82E. It is possible to correct the ink droplet ejection amount ejected from the upstream nozzles or the downstream nozzles in the multiple stages. Accordingly, it is possible to accurately reduce the dispersion in the ink droplet ejection amount among the nozzles 10.

Further, in this embodiment, when the first pattern portions 72A to 72E are recorded, the same ink droplet ejection amount per unit area is used. When the first pattern portions 72F to 72I are recorded, then the ink droplet ejection amount per unit area is decreased as compared with when the first pattern portions 72A to 72E are recorded, and the ink droplet ejection amount per unit area is more decreased when the first pattern portions disposed nearer to the right end are recorded. Accordingly, the densities of the first pattern portions 72F to 72I can be thinned as compared with the densities of the first pattern portions 72A to 72E. Further, the densities can be more thinned at the first pattern portions disposed nearer to the right end.

Further, in this embodiment, when the second pattern portions 82E to 82I are recorded, the same ink droplet ejection amount per unit area is used. When the second pattern portions 82A to 82D are recorded, then the ink droplet ejection amount per unit area is decreased as compared with when the second pattern portions 82E to 82I are recorded, and the ink droplet ejection amount per unit area is more decreased when the second pattern portions disposed nearer to the left end are recorded. Accordingly, the densities of the second pattern portions 82A to 82D can be thinned as compared with the densities of the second pattern portions 82E to 82I. Further, the densities can be more thinned at the second pattern portions disposed nearer to the left end.

Further, in this embodiment, the first pattern portions 72A to 72E are recorded by using the same mask data. When the first pattern portions 72F to 72I are recorded, then the mask data, in which the thinning out rate is higher than that used upon the recording of the first pattern portions 72A to 72E, is used, and the mask data, in which the thinning out rate is higher, is used upon the recording of the first pattern portion disposed nearer to the right end. Accordingly, the ejection amounts per unit area, which are provided when the first pattern portions 72F to 72I are recorded, can be made smaller than those provided when the first pattern portions 72A to 72E are recorded. Further, the ejection amounts per unit area can be decreased for the first pattern portions disposed nearer to the right end.

Further, in this embodiment, the second pattern portions 82E to 82I are recorded by using the same mask data. When the second pattern portions 82A to 82D are recorded, then the mask data, in which the thinning out rate is higher than that used upon the recording of the second pattern portions 82E to 82I, is used, and the mask data, in which the thinning out rate is higher, is used upon the recording of the second pattern portion disposed nearer to the left end. Accordingly, the ejection amounts per unit area, which are provided when the second pattern portions 82A to 82D are recorded, can be made smaller than those provided when the second pattern portions 82E to 82I are recorded. Further, the ejection amounts per unit area can be decreased for the second pattern portions disposed nearer to the left end.

Further, in this embodiment, the nonuniformity correction patterns 70 (first pattern group 71 and second pattern group 81) are recorded in the stable state in which the recording paper P is interposed by both of the conveying roller 6 and the conveying roller 7. Accordingly, it is possible to prevent the positions of the respective first pattern portions 72A to 72I and the respective second pattern portions 82A to 82I from being deviated on the recording paper P.

Further, in this embodiment, the ink droplet ejection amounts ejected from the nozzles 10 are corrected on the basis of the selection signal inputted by the user by operating the operation unit 61. Thus, it is possible to reduce the dispersion in the ink droplet ejection amount among the nozzles 10.

Further, in this embodiment, the nonuniformity correction pattern 70 is recorded immediately after the completion of the initial introduction. Therefore, the ink droplet ejection amount ejected from the nozzle 10 is corrected on the basis of the recording result of the nonuniformity correction pattern 70. Thus, it is possible to reduce the dispersion in the ink droplet ejection amount among the nozzles 10 from the initial use of the printer 1.

Modified Embodiments

The preferred embodiment of the present teaching has been explained above. However, the present teaching is not limited to the embodiment described above, which can be variously changed within a scope defined in claims.

Figure 8A:
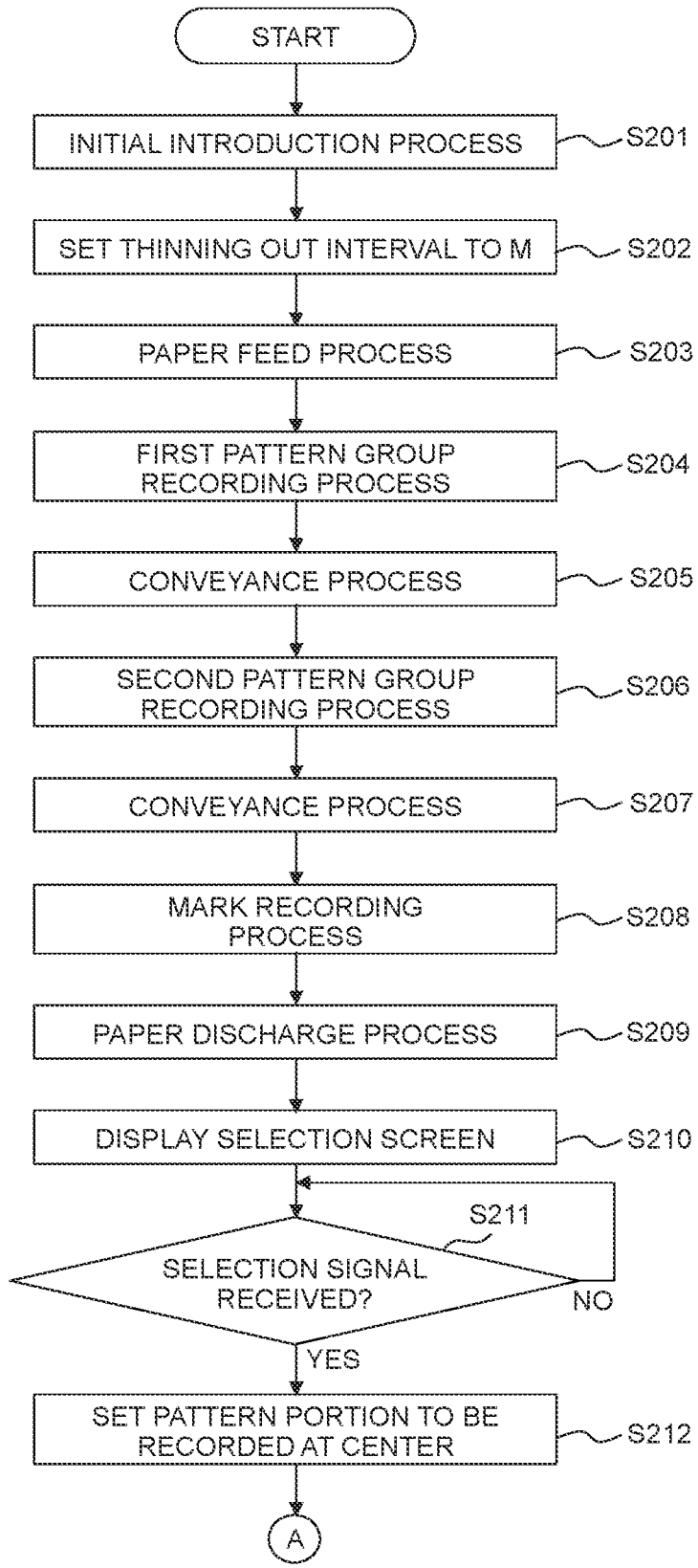
FIGS. 8A and 8B are a flow chart illustrative of the flow of the process to be performed upon the initial startup when the nonuniformity correction pattern is recorded again on the basis of the recording result of the nonuniformity correction pattern.
Figure 8B:
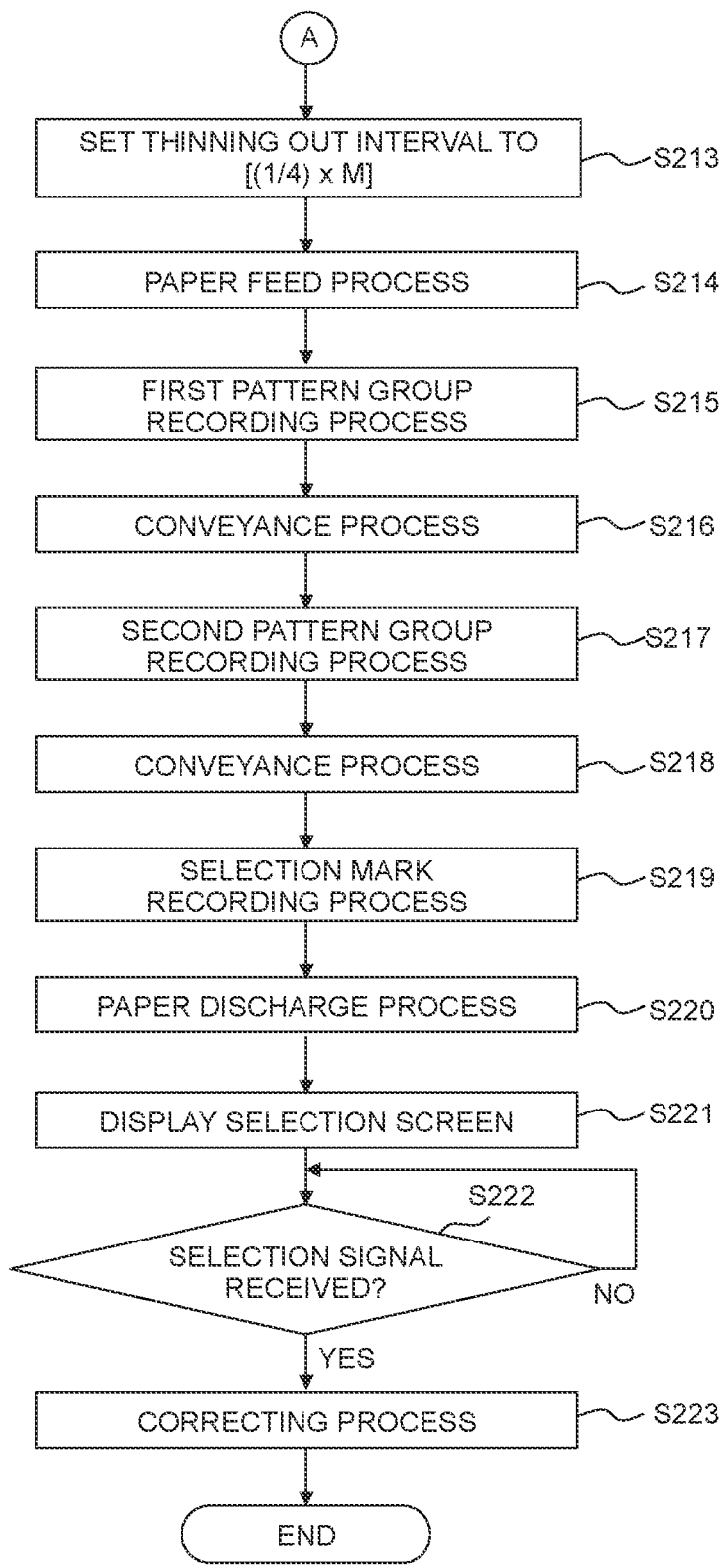

For example, in a first modified embodiment, the controller 50 performs the process in accordance with a flow depicted in FIGS. 8A and 8B upon the initial startup of the printer 1. An explanation will be made in more detail below. The controller 50 executes the initial introduction process (S201) which is the same as or equivalent to S101 in the same manner as the embodiment described above, and then the controller 50 sets the thinning out interval to M (S202). In this case, the thinning out interval is the difference in the thinning out rate of the mask data to be used between the adjoining first pattern portions 72E to 72I and between the adjoining second pattern portions 82E to 82I. Then, the processes of S203 to S211 are executed in the same manner as S102 to S110 of the embodiment described above.

Accordingly, when the first pattern group 71 is recorded in S204, the first pattern portions 72A to 72I are recorded by using the mask data having the thinning out rate as depicted in FIG. 7A in the same manner as the embodiment described above. Further, when the second pattern group 81 is recorded in S206, the second pattern portions 82A to 82I are recorded by using the mask data having the thinning out rate as depicted in FIG. 7B in the same manner as the embodiment described above.

Then, when the selection signal is received (S211: YES), the controller 50 sets the first and second pattern portions for constructing the pattern set 74 indicated by the selection signal to the first and second pattern portions to be recorded at the center in the scanning direction in S215, S217 described later on (S212). That is, the first and second pattern portions described above are set to the reference first and second pattern portions again.

Subsequently, the controller 50 sets the thinning out interval to [(¼)×M] which is smaller than M set in S202 (S213). After that, the controller 50 executes the processes of S214 to S222 in the same manner as S102 to S110 of the embodiment described above.

However, it is assumed that M1 represents the thinning out rate of the mask data used for the recording of the first pattern portions for constructing the pattern set 74 indicated by the selection signal received in S211. On this assumption, as depicted in FIG. 9A, when the first pattern portions 72A to 72E are recorded in S215, the mask data having the thinning out rate of M1 is used. Further, when the first pattern portions 72F, 72G, 72H, 72I are recorded, the mask data having the thinning out rates of [M1+(¼)×M], [M1+(½)×M], [M1+(¾)×M], [M1+M] respectively are used.

Further, it is assumed that M2 represents the thinning out rate of the mask data used for the recording of the second pattern portions for constructing the pattern set 74 indicated by the selection signal received in S211. On this assumption, as depicted in FIG. 9B, when the second pattern portions 82E to 82I are recorded in S217, the mask data having the thinning out rate of M2 is used. Further, when the second pattern portions 82D, 82C, 82B, 82A are recorded, the mask data having the thinning out rates of [M2+(¼)×M], [M2+(½)×M], [M2+(¾)×M], [M2+M] respectively are used.

Accordingly, in the case of the nonuniformity correction pattern 70 recorded in accordance with S214 to S217, the first pattern portion 71E and the second pattern portion 82E, which constitute the pattern set 74 disposed at the center in the scanning direction, have the densities that are the same as the densities of the first pattern portion and the second pattern portion which constitute the pattern set 74 included in the nonuniformity correction pattern 70 recorded in accordance with S203 to S206 and corresponding to the selection signal received in S211. Further, in the case of the nonuniformity correction pattern 70 recorded in accordance with S214 to S217, the density difference among the first pattern portions 72A to 72E, 72F, 72G, 72H, 72I and the density difference among the second pattern portions 82A, 82B, 82C, 82D, 82E to 82I are decreased as compared with the nonuniformity correction pattern 70 recorded in accordance with S203 to S206.

Then, when the selection signal is received (S222: YES), the controller 50 executes the correcting process (S223). In this procedure, in the first modified embodiment, as depicted in FIG. 9C, a table is stored, in which the selection signal ("A" to "I") received in S211 and the selection signal ("A" to "I") received in S222 are correlated with the correction amount of the ink droplet ejection amount. In the correcting process of S223, the correction amount is decided on the basis of the selection signals received in S211, S222 and FIG. 9C to correct the ink droplet ejection amounts ejected from the upstream nozzles or the downstream nozzles. The correction amount depicted in FIG. 9C is obtained by adding the correction amount which is decided on the basis of the selection signal received in S211 and the correction amount which is decided on the basis of the selection signal received in S222.

In the first modified embodiment, the nonuniformity correction pattern 70 is recorded on the basis of the recording result of the nonuniformity correction pattern 70. In relation to the nonuniformity correction pattern 70 recorded again, the density difference among the first pattern portions 72A to 72E, 72F, 72G, 72H, 72I and the density difference among the second pattern portions 82A, 82B, 82C, 82D, 82E to 82I are made smaller than those of the nonuniformity correction pattern 70 recorded previously. Accordingly, it is possible to accurately correct the dispersion in the ink droplet ejection amount among the nozzles 10 on the basis of the recording result of the nonuniformity correction pattern 70 recorded previously and the recording result of the nonuniformity correction pattern 70 recorded again.

Note that in the first modified embodiment, the thinning out interval is set to "(¼)×M" in S213, and the adjusting correction amount is provided as depicted in FIGS. 9A to 9C in conformity therewith. However, there is no limitation thereto. The thinning out interval may be set to another thinning out interval which is smaller than M, and the adjusting correction amount may be set in conformity therewith.

Further, in the embodiment described above, if the selection signal indicates the pattern set 74 which is disposed on the left side from the first pattern portion 72E and the second pattern portion 82E, the ejection amount is corrected so that the ink droplet ejection amounts ejected from the downstream nozzles are decreased. Further, if the selection signal indicates the pattern set 74 which is disposed on the right side from the first pattern portion 72E and the second pattern portion 82E, the ejection amount is corrected so that the ink droplet ejection amounts ejected from the upstream nozzles are decreased. However, there is no limitation thereto.

In a second modified embodiment, as depicted in FIG. 10A, if the selection signal indicates the pattern set 74 which is disposed on the left side from the first pattern portion 72E and the second pattern portion 82E (if any one of "A" to "D" is selected), then the ejection amount is corrected so that the ink droplet ejection amounts ejected from the upstream nozzles are increased, and the ink droplet ejection amounts ejected from the upstream nozzles are more increased if the pattern set 74 indicated by the selection signal is the pattern set 74 disposed nearer to the left end.

Further, if the selection signal indicates the pattern set 74 which is disposed on the right side from the first pattern portion 72E and the second pattern portion 82E (if any one of "F" to "I" is selected), then the ejection amount is corrected so that the ink droplet ejection amounts ejected from the downstream nozzles are increased, and the ink droplet ejection amounts ejected from the downstream nozzles are more increased if the pattern set 74 indicated by the selection signal is disposed nearer to the right end.

In a third modified embodiment, as depicted in FIG. 10B, if the selection signal indicates the pattern set 74 which is disposed on the left side from the first pattern portion 72E and the second pattern portion 82E (if any one of "A" to "D" is selected), then the ejection amount is corrected so that the ink droplet ejection amounts ejected from the upstream nozzles are increased, and the ink droplet ejection amounts ejected from the downstream nozzles are decreased. Further, the ejection amount is corrected so that the ink droplet ejection amounts ejected from the upstream nozzles are more increased, and the ink droplet ejection amounts ejected from the downstream nozzles are more decreased, if the pattern set 74 indicated by the selection signal is the pattern set 74 disposed nearer to the left end.

Further, if the selection signal indicates the pattern set 74 which is disposed on the right side from the first pattern portion 72E and the second pattern portion 82E (if any one of "F" to "I" is selected), then the ejection amount is corrected so that the ink droplet ejection amounts ejected from the upstream nozzles are decreased, and the ink droplet ejection amounts ejected from the downstream nozzles are increased. Further, the ejection amount is corrected so that the ink droplet ejection amounts ejected from the upstream nozzles are more decreased, and the ink droplet ejection amounts ejected from the downstream nozzles are more increased, if the pattern set 74 indicated by the selection signal is the pattern set 74 disposed nearer to the right end. However, in the third modified embodiment, each of the magnitudes of the correction amounts of the ejection amounts ejected from the upstream nozzles and the downstream nozzles is a half of that provided in the embodiment described above.

It is also possible to reduce the dispersion in the ink droplet ejection amount among the nozzles 10 by correcting the ink droplet ejection amount ejected from the nozzle 10b or the ink droplet ejection amounts ejected from both of the nozzles 10a, 10b as in the second and third modified embodiments.

Further, in the embodiment described above, the first pattern group 71 and the second pattern group 81 are recorded by ejecting the ink droplets from all of the nozzles 10 for constructing the nozzle array 9. However, there is no limitation thereto.

Figure 11A:
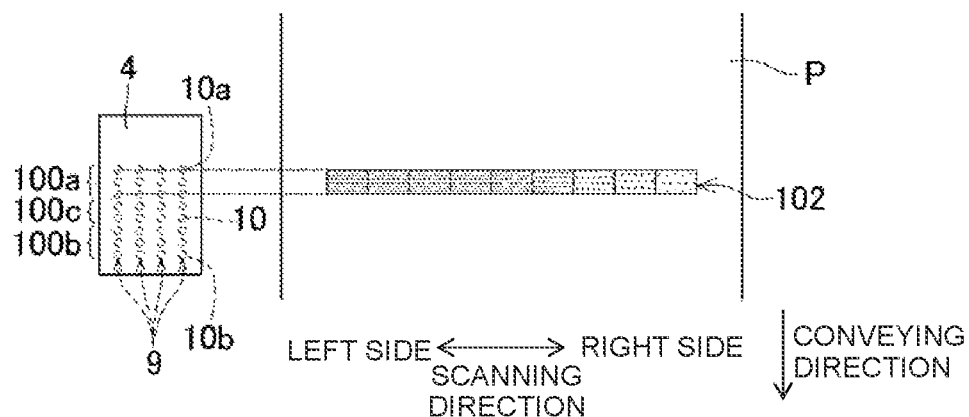
FIG. 11A is a drawing illustrative of the recording of the first pattern group based on the use of the first nozzle group.
Figure 11B:
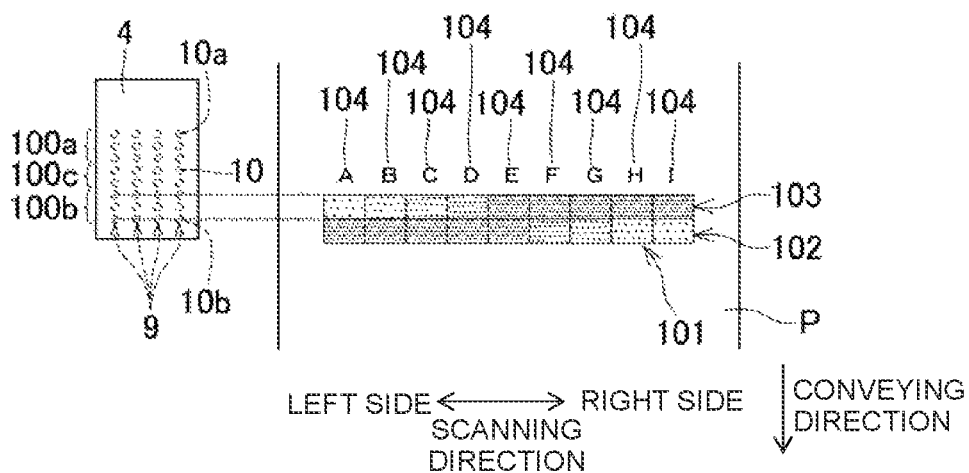
FIG. 11B is a drawing illustrative of the recording of the second pattern group and the selection marks based on the use of the second nozzle group.

In a fourth modified embodiment, as depicted in FIGS. 11A and 11B, the nozzle arrays 9 have a first nozzle group 100a, a second nozzle group 100b, and a third nozzle group 100c. The first nozzle group 100a is composed of a plurality of nozzles 10 which include nozzles 10a and which are aligned continuously in the conveying direction. The second nozzle group 100b is composed of a plurality of nozzles 10 which include nozzles 10b and which are aligned continuously in the conveying direction. The third nozzle group 100c is positioned between the first nozzle group 100a and the second nozzle group 100b in the conveying direction, and the third nozzle group 100c is composed of a plurality of nozzles 10 which are aligned continuously in the conveying direction. Accordingly, in the fourth modified embodiment, the first nozzle group 100a is composed of some of the nozzles 10 which include the nozzles 10a of the nozzle arrays 9 and which are aligned continuously on the upstream side from the nozzles 10 positioned at the center in the conveying direction. Further, the second nozzle group 100b is composed of some of the nozzles 10 which include the nozzles 10b of the nozzle arrays 9 and which are aligned continuously on the downstream side from the nozzles 10 positioned at the center in the conveying direction.

Then, in the fourth modified embodiment, as depicted in FIG. 11A, a first pattern group 102 is recorded by ejecting the ink droplets from the nozzles 10 which constitute the first nozzle group 100a. Further, as depicted in FIG. 11B, a second pattern group 103 is recorded by ejecting the ink droplets from the nozzles 10 which constitute the second nozzle group 100b. Accordingly, it is possible to record a nonuniformity correction pattern 101 having the first pattern group 102 and the second pattern group 103. Further, selection marks 104 are recorded by ejecting the ink droplets from the nozzles 10 which constitute at least one of the first nozzle group 100a and the third nozzle group 100c, in the recording pass for recording the second pattern group 103. Note that the selection marks may be recorded in any recording pass which is distinct from the recording pass for recording the second pattern group 103, in the same manner as the embodiment described above.

In the fourth modified embodiment, the first pattern group 102 is recorded by ejecting the ink droplets from the first nozzle group 100a, and the second pattern group 103 is recorded by ejecting the ink droplets from the second nozzle group 100b. Therefore, each of the first pattern group 102 and the second pattern group 103 has a length to a certain extent in the conveying direction, while recording the first pattern group 102 and the second pattern group 103 by means of one time of the recording pass respectively. Accordingly, the nonuniformity correction pattern 101 can be visually recognized with ease.

Further, in the fourth modified embodiment, the first pattern group 102 is recorded by ejecting the ink droplets from the first nozzle group 100a, and the second pattern group 103 is recorded by ejecting the ink droplets from the second nozzle group 100b. Thus, it is possible to provide such a situation that the nozzles 10 to be used for the recording of the first pattern group 102 are not overlapped with the nozzles 10 to be used for the recording of the second pattern group 103. Accordingly, it is possible to suppress the amounts of the ink droplets consumed in the recording of the nonuniformity correction pattern 101.

Further, in the fourth modified embodiment, the nozzle arrays 9 have the third nozzle group 100c which is not used for the recording of any one of the first pattern group 102 and the second pattern group 102 and which is disposed between the first nozzle group 100a to be used for the recording of the first pattern group 102 and the second nozzle group 100b to be used for the recording of the second pattern group 103. Accordingly, it is possible to suppress the amounts of the inks to be consumed for the recording of the nonuniformity correction pattern 101 as compared with a case in which the nozzle arrays 9 do not have the nozzles 10 that are not used for the recording of any one of the first pattern group 102 and the second pattern group 103.

Further, in the fourth modified embodiment, the nozzle arrays 9 have the third nozzle group 100c which is composed of the plurality of nozzles 10 aligned continuously in the conveying direction between the first nozzle group 100a and the second nozzle group 100b. However, there is no limitation thereto. The nozzle arrays 9 may have only one nozzle 10 between the first nozzle group 100a and the second nozzle group 100b.

Further, the present teaching is not limited to such configuration as well that the nozzle arrays 9 have the nozzles 10 which are not used for the recording of any one of the first pattern group 102 and the second pattern group 103. For example, the first nozzle group, which is used for the recording of the first pattern group, may be formed by a half of the nozzle arrays 9 disposed on the upstream side in the conveying direction, and the second nozzle group, which is used for the recording of the second pattern group, may be formed by a half of the nozzle arrays 9 disposed on the downstream side in the conveying direction.

Further, when the first and second pattern groups are recorded by using the nozzles 10 which constitute some of the nozzle arrays 9, the nozzles 10 to be used for the recording of the first pattern group may be partially overlapped with the nozzles 10 to be used for the recording of the second pattern group.

Further, the present teaching is not limited to such configuration as well that the first and second pattern groups are recorded by ejecting the ink droplets from the plurality of nozzles 10 aligned continuously. For example, the first pattern group may be recorded by using only the nozzles 10a. Further, the second pattern group may be recorded by using only the nozzles 10b. Further, in the procedures as described above, the first and second pattern groups, which have lengths to a certain extent in the conveying direction, may be recorded by repeating the recording pass and the conveyance action.

Further, in the embodiment described above, the density of the pattern portion is allowed to differ by changing the ink droplet ejection amount per unit area by changing the thinning out rate of the mask data. However, there is no limitation thereto.

In a fifth modified embodiment, the ink-jet head 4 can selectively eject, from the respective nozzles 10, two types of ink droplets having different volumes, i.e., large droplets and small droplets having volumes smaller than those of the large droplets.

Then, in the fifth modified embodiment, as depicted in FIGS. 12A and 12B, when the first pattern portions 72A to 72E and the second pattern portions 82E to 82I are recorded, then the ratio of the small droplets is zero, i.e., all of the ink droplets ejected from the nozzles 10 are the large droplets.

Further, as depicted in FIG. 12A, when the first pattern portions 72F to 72I are recorded, the ratios of the small droplets are R1, R2, R3, and R4 respectively. In this case, as for R1 to R4, the magnitude correlation is R1<R2<R3<R4. That is, when the first pattern portions 72F to 72I are recorded, the ratios of the small droplets are raised as compared with when the first pattern portions 72A to 72E are recorded. Further, when the first pattern portions, which are disposed nearer to the right end, are recorded, the ratios of the small droplets are more raised.

Further, as depicted in FIG. 12B, when the second pattern portions 82A to 82D are recorded, the ratios of the small droplets are R4, R3, R2, and R1 respectively. That is, when the second pattern portions 82A to 82D are recorded, the ratios of the small droplets are raised as compared with when the second pattern portions 82E to 82I are recorded. Further, when the second pattern portions, which are disposed nearer to the left end, are recorded, the ratios of the small droplets are more raised.

In the fifth modified embodiment, the ratios of the small droplets are provided as described above when the first pattern portions 72A to 72I are recorded. Thus, the ejection amount per unit area, which is provided when the first pattern portions 72F to 72I are recorded, is decreased as compared with when the first pattern portions 72A to 72E are recorded. Further, when the first pattern portions, which are disposed nearer to the right end, are recorded, the ejection amount per unit area can be more decreased.

Further, in the fifth modified embodiment, the ratios of the small droplets are provided as described above when the second pattern portions 82A to 82I are recorded. Thus, the ejection amount per unit area, which is provided when the second pattern portions 82A to 82D are recorded, is decreased as compared with when the second pattern portions 82A to 82I are recorded. Further, when the second pattern portions, which are disposed nearer to the left end, are recorded, the ejection amount per unit area can be more decreased.

Further, the magnitude correlation of the densities of the first pattern portions 72A to 72I and the magnitude correlation of the densities of the second pattern portions 82A to 82I may be provided as described above by means of any method other than the method in which the thinning out rate of the mask data is changed and the method in which the ratio of the small droplets is changed.

For example, the image data for recording the first pattern portion may be allowed to differ among the first pattern portions 72A to 72E, 72F, 72G, 72H, 72I, and thus the magnitude correlation of the densities of the first pattern portions 72A to 72I may be provided as described above. Similarly, the image data for recording the second pattern portion may be allowed to differ among the second pattern portions 82A, 82B, 82C, 82D, 82E to 82I, and thus the magnitude correlation of the densities of the second pattern portions 82A to 82I may be provided as described above.

Further, the magnitude correlation of the densities among the first pattern portions 72A to 72I in the first pattern group 71 and the magnitude correlation of the densities among the second pattern portions 82A to 82I in the second pattern group 81 are not limited to those of the embodiment described above.

Also in a sixth modified embodiment, the controller 50 performs the process in accordance with the flow depicted in FIG. 5 upon the initial startup of the printer 1. However, in the sixth modified embodiment, the processes of S103, S105, and S111 are different from those of the embodiment described above.

Figure 13A:
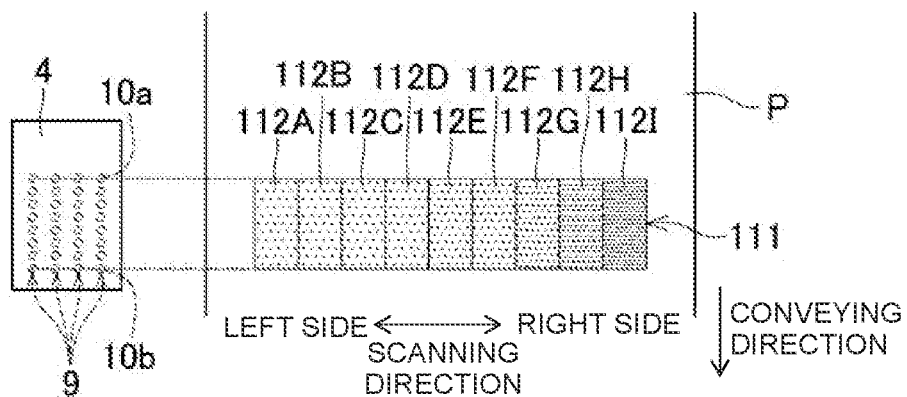
FIG. 13A is a drawing illustrative of the recording of the first pattern group when the relationship concerning the density among the first pattern portions is reversed.

In the sixth modified embodiment, the controller 50 operates such that a first pattern group 111 as depicted in FIG. 13A is recorded on the recording paper P by performing the recording pass in the first pattern group recording process of S103.

The first pattern group 111 is composed of a plurality of first pattern portions 112A to 112I which are aligned adjacently in the scanning direction. The first pattern portions 112A to 112I are rectangular fill patterns. Note that in the sixth modified embodiment, the first pattern portion 112E, which is positioned at the center in the scanning direction, corresponds to the "reference first pattern portion" of the present teaching. Further, the first pattern portion 112I corresponds to the "first pattern portion disposed at the outermost end on one side in the second direction" of the present teaching. Further, the first pattern portion 112A corresponds to the "first pattern portion disposed at the outermost end on the other side in the second direction" of the present teaching.

Further, in the first pattern group recording process, the controller 50 operates to record the first pattern portions 112A to 112E so that the first pattern portion 112E and the first pattern portions 112A to 112D positioned on the left side therefrom have the same density. Further, the controller 50 operates to record the first pattern portions 112F to 112I so that the first pattern portions 112F to 112I, which are positioned on the right side from the first pattern portion 112E, have the densities that are thicker than the density of the first pattern portion 112E, wherein the densities are thicker at the first pattern portions disposed nearer to the right end (having farther distances from the first pattern portion 112A).

In this procedure, for example, as depicted in FIG. 14A, when the first pattern portions 112A to 112E are recorded, the mask data, in which the thinning out rate is (4×M), is used. Further, when the first pattern portions 112F, 112G, 112H, 112I are recorded, the mask data, in which the thinning out rates are (3×M), (2×M), M, 0 respectively, are used.

Figure 13B:
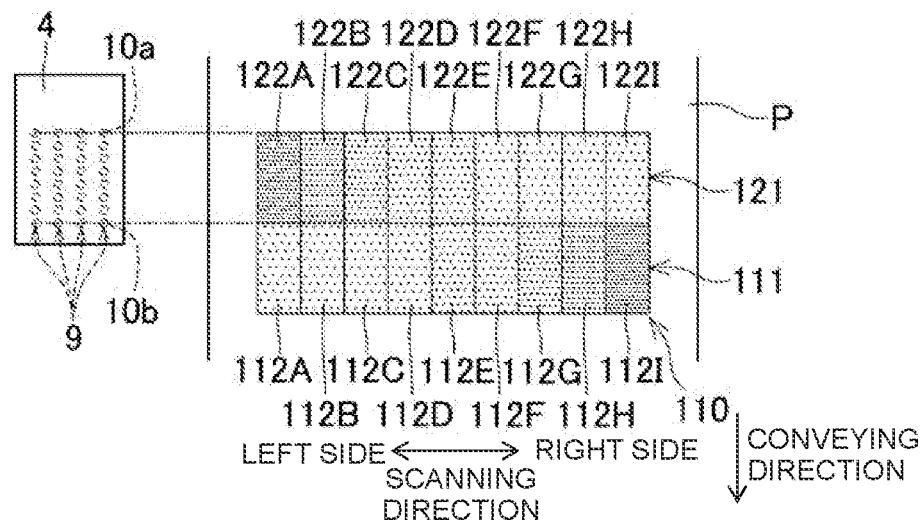
FIG. 13B is a drawing illustrative of the recording of the second pattern group when the relationship concerning the density among the second pattern portions is reversed.

In the second pattern group recording process of S105, the controller 50 operates to record a second pattern group 121 as depicted in FIG. 13B by performing the recording pass.

The second pattern group 121 is composed of a plurality of second pattern portions 122A to 122I which are aligned adjacently in the scanning direction. The second pattern portions 122A to 122I are rectangular fill patterns. Further, the second pattern portions 122A to 122I are aligned adjacently on the upstream side in the conveying direction of the first pattern portions 112A to 112I respectively. Accordingly, the portions of the first pattern portions 112A to 112I recorded by the nozzles 10a and the portions of the second pattern portions 122A to 122I recorded by the nozzles 10b are adjacent to one another in the conveying direction.

Further, in the second pattern group recording process, the controller 50 operates to record the second pattern portions 122A to 122E so that the second pattern portion 122E and the second pattern portions 122F to 122I positioned on the right side therefrom have the same density. Further, assuming that there is no dispersion in the ink droplet ejection amount among the plurality of nozzles 10 for constructing the nozzle array 9, the controller 50 operates to record the second pattern portions 122E to 122I so that the second pattern portions 122E to 122I have the same densities as the densities of the first pattern portions 112A to 112E. Further, the controller 50 operates to record the second pattern portions 122A to 122D so that the second pattern portions 122A to 122D, which are positioned on the left side from the second pattern portion 122E, have the densities that are thicker than the density of the second pattern portion 122E, wherein the densities are thicker at the second pattern portions disposed nearer to the left end (having farther distances from the second pattern portion 122I).

In this procedure, for example, as depicted in FIG. 14B, when the second pattern portions 122A, 122B, 122C, 122D are recorded, the mask data, in which the thinning out rates are 0, M, (2×M), (3×M) respectively, are used. Further, when the second pattern portions 122E to 122I are recorded, the mask data, in which the thinning out rate is (4×M), is used.

Figure 13C:
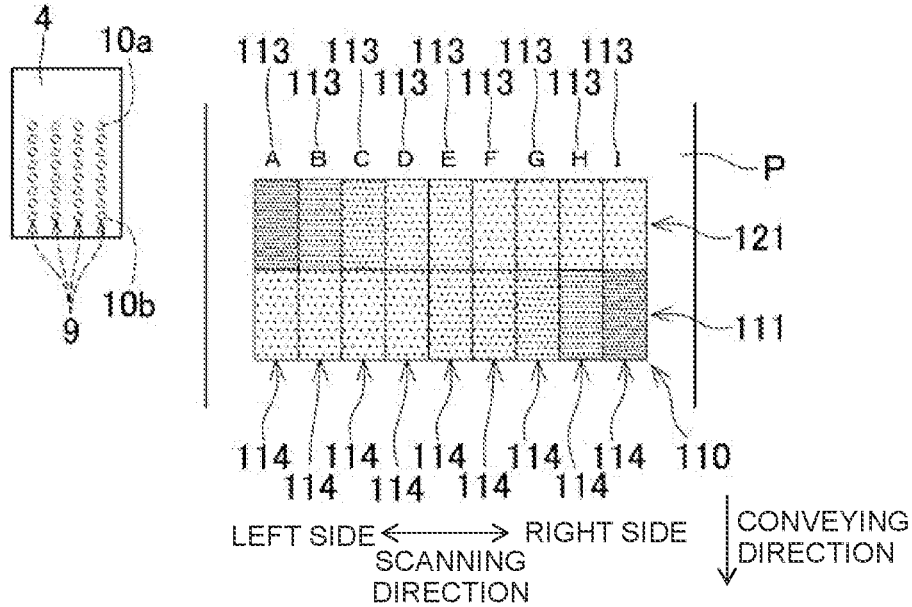
FIG. 13C is a drawing illustrative of the recording of the selection marks when the relationship concerning the density among the first pattern portions is reversed.

Then, the first pattern group 111 and the second pattern group 121 are recorded as described above, and thus a nonuniformity correction pattern 110, which has the first pattern group 111 and the second pattern group 121, can be recorded. Further, also in the sixth modified embodiment, in S107, as depicted in FIG. 13C, selection marks 113 are recorded for respective pattern sets 114 of the first pattern portions and the second pattern portions aligned in the conveying direction.

In the correcting process of S11, as depicted in FIG. 14C, if the selection signal indicates the pattern set 114 of the first pattern portion 112E and the second pattern portion 122E (if "E" is selected), then the controller 50 does not correct the ink droplet ejection amount ejected from the nozzles 10.

Further, if the selection signal indicates the set disposed on the left side from the pattern set 114 of the first pattern portion 112E and the second pattern portion 122E (if any one of "A" to "D" is selected), then the controller 50 performs the correction to increase the ink droplet ejection amounts ejected from the downstream nozzles. Further, in this procedure, when the pattern set 114 indicated by the selection signal is disposed nearer to the left end, the ink droplet ejection amounts ejected from the downstream nozzles are more increased.

Further, if the selection signal indicates the pattern set 114 disposed on the right side from the pattern set 114 of the first pattern portion 112E and the second pattern portion 122E (if any one of "F" to "I" is selected), then the controller 50 performs the correction to increase the ink droplet ejection amounts ejected from the upstream nozzles. Further, in this procedure, when the pattern set 114 indicated by the selection signal is the pattern set 114 which is disposed nearer to the right end, the ink droplet ejection amounts ejected from the upstream nozzles are more increased.

Also in the sixth modified embodiment, the ink droplets ejection amounts ejected from the upstream nozzles including the nozzles 10a or the downstream nozzles including the nozzles 10b may be corrected on the basis of the position of the pattern set 114 in which the smallest density difference is provided at the boundary between the first pattern portion and the second pattern portion. Thus, it is possible to reduce the dispersion in the ink droplet ejection amount among the nozzles 10.

Further, in the correcting process of the sixth modified embodiment, the following procedure is also available in place of the execution of the correction to increase the ink droplet ejection amounts ejected from the downstream nozzles. That is, the correction may be performed to decrease the ink droplet ejection amounts ejected from the upstream nozzles. Alternatively, the correction may be performed to increase the ink droplet ejection amounts ejected from the downstream nozzles and decrease the ink droplet ejection amounts ejected from the upstream nozzles.

Further, in the correcting process of the sixth modified embodiment, the following procedure is also available in place of the execution of the correction to increase the ink droplet ejection amounts ejected from the upstream nozzles. That is, the correction may be performed to decrease the ink droplet ejection amounts ejected from the downstream nozzles. Alternatively, the correction may be performed to increase the ink droplet ejection amounts ejected from the upstream nozzles and decrease the ink droplet ejection amounts ejected from the downstream nozzles.

Further, in the embodiment described above, if there is no dispersion in the ink droplet ejection amount among the plurality of nozzles 10, the first pattern portions 72A to 72I and the second pattern portions 82A to 82I are recorded so that all of the densities of the respective portions in the pattern portions are constant in relation to the first pattern portions 72A to 72I and the second pattern portions 82A to 82I respectively. However, there is no limitation thereto.

Figure 15:
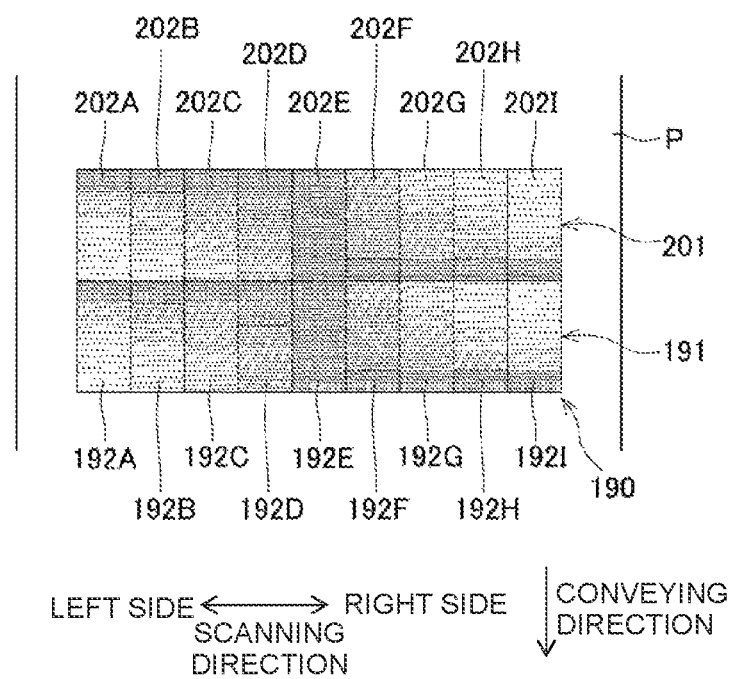
FIG. 15 is a drawing illustrative of the nonuniformity correction pattern when the density difference is allowed to appear in the pattern portion.

In a seventh modified embodiment, the controller 50 also performs the process in accordance with the flow depicted in FIG. 5 upon the initial startup of the printer 1. However, as depicted in FIG. 15, in the seventh modified embodiment, a first pattern group 191, which is recorded in the first pattern group recording process of S103, is different from the first pattern group 71 of the embodiment described above. Further, a second pattern group 201, which is recorded in the second pattern group recording process of S105, is different from the second pattern group 81 of the embodiment described above.

The first pattern group 191 is composed of a plurality of first pattern portions 192A to 192I which are aligned adjacently in the scanning direction. The first pattern portions 192A to 192I are rectangular fill patterns. Note that in the seventh modified embodiment, the first pattern portion 192E, which is positioned at the center in the scanning direction, corresponds to the "reference first pattern portion" of the present teaching. Further, the first pattern portion 192I corresponds to the "first pattern portion disposed at the outermost end on one side in the second direction". Further, the first pattern portion 192A corresponds to the "first pattern portion disposed at the outermost end on the other side in the second direction".

Further, in the seventh modified embodiment, in the first pattern group recording process, the controller 50 operates to record the first pattern portion 192E so that the density is constant if there is no dispersion in the ink droplet ejection amount among the plurality of nozzles 10 for constructing the nozzle arrays 9.

Further, in the seventh modified embodiment, in the first pattern group recording process, the controller 50 operates to record the first pattern portions 192A to 192D disposed on the left side from the first pattern portion 192E so that the densities are more thinned at positions separated farther from the nozzle 10a to approach the nozzle 10b in the conveying direction if there is no dispersion in the ink droplet ejection amount among the plurality of nozzles 10 for constructing the nozzle arrays 9. Further, in this procedure, the controller 50 operates to record the first pattern portions 192A to 192D so that the average density is thinner than the density of the first pattern portion 192E, and the density change in the conveying direction is more increased at the first pattern portions disposed nearer to the left end.

Further, in the seventh modified embodiment, in the first pattern group recording process, the controller 50 operates to record the first pattern portions 192F to 192I disposed on the right side from the first pattern portion 192E so that the densities are more thinned at positions separated farther from the nozzle 10b to approach the nozzle 10a in the conveying direction if there is no dispersion in the ink droplet ejection amount among the plurality of nozzles 10 for constructing the nozzle arrays 9. Further, in this procedure, the controller 50 operates to record the first pattern portions 192F to 192I so that the average density is thinner than the density of the first pattern portion 192E, and the density change in the conveying direction is more increased at the first pattern portions disposed nearer to the right end.

The second pattern group 201 is composed of a plurality of second pattern portions 202A to 202I which are aligned adjacently in the scanning direction. The second pattern portions 202A to 202I are rectangular fill patterns. Note that in the seventh modified embodiment, the second pattern portion 202E, which is positioned at the center in the scanning direction, corresponds to the "reference second pattern portion" of the present teaching. Further, the second pattern portion 202I corresponds to the "second pattern portion disposed at the outermost end on one side in the second direction". Further, the second pattern portion 202A corresponds to the "second pattern portion disposed at the outermost end on the other side in the second direction".

Further, in the seventh modified embodiment, in the second pattern group recording process, the controller 50 operates to record the second pattern portion 202E so that the density is constant in the same manner as the first pattern portion 192E if there is no dispersion in the ink droplet ejection amount among the plurality of nozzles 10 for constructing the nozzle arrays 9.

Further, in the seventh modified embodiment, in the second pattern group recording process, the controller 50 operates to record the second pattern portions 202A to 202D disposed on the left side from the second pattern portion 202E so that the densities are more thinned at positions separated farther from the nozzle 10a to approach the nozzle 10b in the conveying direction if there is no dispersion in the ink droplet ejection amount among the plurality of nozzles 10 for constructing the nozzle arrays 9. Further, in this procedure, the controller 50 operates to record the second pattern portions 202A to 202D so that the average density is thinner than the density of the second pattern portion 202E, and the density change in the conveying direction is more increased at the second pattern portions disposed nearer to the left end.

Further, in the seventh modified embodiment, in the second pattern group recording process, the controller 50 operates to record the second pattern portions 202F to 202I disposed on the right side from the second pattern portion 202E so that the densities are more thinned at positions separated farther from the nozzle 10b to approach the nozzle 10a in the conveying direction if there is no dispersion in the ink droplet ejection amount among the plurality of nozzles 10 for constructing the nozzle arrays 9. Further, in this procedure, the controller 50 operates to record the second pattern portions 202F to 202I so that the average density is thinner than the density of the second pattern portion 202E, and the density change in the conveying direction is more increased at the second pattern portions disposed nearer to the right end.

Then, in the seventh modified embodiment, the first pattern group 191 and the second pattern group 201 are recorded as described above, and thus the nonuniformity correction pattern 190, which has the first pattern group 191 and the second pattern group 201, is recorded.

In the seventh modified embodiment, the ink droplet ejection amount ejected from the plurality of nozzles 10 is corrected to be the ejection amount provided when the recording is performed for the pattern set 194 in which the smallest density difference is provided at the boundary between the first pattern group 191 and the second pattern group 201. Accordingly, it is possible to reduce the dispersion in the ink droplet ejection amount ejected from the plurality of nozzles 10. Further, in this case, the density nonuniformity can be made hardly conspicuous at the boundary of the image portions recorded by the two continuous recording passes. Further, the density nonuniformity in the conveying direction can be also made hardly conspicuous in relation to the image portions recorded by the respective recording passes.

Further, in the embodiment described above, the first pattern group 71 has the plurality of first pattern portions 72A to 72D disposed on the left side from the first pattern portion 72E, and the first pattern group 71 has the plurality of first pattern portions 72F to 72I disposed on the right side from the first pattern portion 72E. Similarly, the second pattern group 81 has the plurality of second pattern portions 82A to 82D disposed on the left side from the second pattern portion 82E, and the second pattern group 81 has the plurality of second pattern portions 82F to 82I disposed on the right side from the second pattern portion 82E. However, there is no limitation thereto.

In the first pattern group 71, the number of the first pattern portion disposed on the left side from the first pattern portion 72E may be only one. In this case, in the second pattern group 81, the number of the second pattern portion disposed on the left side from the second pattern portion 82E is only one as well.

Further, the number of the first pattern portion disposed on the right side from the first pattern portion 72E may be only one. In this case, in the second pattern group 81, the number of the second pattern portion disposed on the right side from the second pattern portion 82E is only one as well.

Further, in the embodiment described above, the nonuniformity correction pattern is recorded in the state in which the recording paper P is interposed by both of the conveying roller 6 and the conveying roller 7. However, there is no limitation thereto. For example, the recording may be performed for at least one of the first pattern group and the second pattern group in a state in which the recording paper P is interposed by only one of the conveying roller 6 and the conveying roller 7.

Further, in the embodiment described above, the selection signal is inputted by allowing the user to operate the operation unit 61 of the printer 1. However, there is no limitation thereto. For example, the selection signal may be inputted by allowing the user to operate PC or the like connected to the printer 1.

Further, in the embodiment described above, the initial introduction is performed by performing the suction purge. However, there is no limitation thereto. For example, a pressurizing pump may be provided at an intermediate portion of the tube 15 for connecting the subtank 3 and the ink cartridge 14. Alternatively, the printer may be provided with a pressurizing pump which is connected to the ink cartridge. Then, the pressurizing pump is driven in a state in which the plurality of nozzles 10 are covered with the cap 41. Accordingly, the initial introduction may be performed in accordance with the so-called pressurizing purge in which the ink contained in the ink-jet head 4 is pressurized so that the ink contained in the ink-jet head 4 is discharged from the nozzles 10. In this case, the pressurizing pump corresponds to the "purge mechanism" of the present teaching.

Further, the initial introduction may be performed by performing both of the suction by the suction pump 42 and the pressurization by the pressurizing pump in the purge. In this case, the combination of the maintenance unit 8 and the pressurizing pump corresponds to the "purge mechanism" of the present teaching.

Further, in the exemplary case described above, the nonuniformity correction pattern is recorded immediately after the completion of the initial introduction, and the ejection amount of the nozzle 10 is corrected on the basis of the recording result. However, there is no limitation thereto. For example, the nonuniformity correction pattern may be recorded at any other timing, for example, when the user makes the instruction by operating the operation unit 61, and the ejection amount of the nozzle 10 may be corrected on the basis of the recording result.

Further, in the exemplary case described above, the ink-jet head 4 has such a characteristic that the ink droplet ejection amount is more increased or decreased at positions separated farther from the nozzle 10a to approach the nozzle 10b in the conveying direction, when the ink droplets are ejected from the plurality of nozzles 10 for constructing the nozzle array 9 by using the same signal. With such an ink-jet head 4, the nonuniformity correction pattern is recorded. The ink droplet ejection amount ejected from the nozzles 10 is corrected on the basis of the recording result. However, there is no limitation thereto.

In an eighth modified embodiment, an ink-jet head 4 has any one of characteristics of the first characteristics as depicted in FIGS. 4A and 4B and the second characteristics as depicted in FIGS. 16A to 16D, when the ink-jet head 4 is driven by an identical signal for the plurality of nozzles 10 for constructing the nozzle arrays 9, for example, on account of the influence of any error brought about upon the production.

The characteristic depicted in FIG. 16A is such a characteristic that the largest ink droplet ejection amount is provided by the nozzle 10 disposed at the center in the conveying direction, and the ink droplet ejection amount is gradually decreased at positions separated farther from the center nozzle 10 to approach the nozzles 10a, 10b in the conveying direction.

The characteristic depicted in FIG. 16B is such a characteristic that the smallest ink droplet ejection amount is provided by the nozzle 10 disposed at the center in the conveying direction, and the ink droplet ejection amount is gradually increased at positions separated farther from the center nozzle 10 to approach the nozzles 10a, 10b in the conveying direction.

The characteristic depicted in FIG. 16C is such a characteristic that the ink droplet ejection amounts ejected from the nozzles 10 other than those disposed at the both ends in the conveying direction of the nozzle array 9 are approximately the same, and the ink droplet ejection amounts ejected from the nozzles 10 disposed at the both ends in the conveying direction of the nozzle array 9 are smaller than the ink droplet ejection amounts ejected from the nozzles 10 other than those disposed at the both ends in the conveying direction.

The characteristic depicted in FIG. 16D is such a characteristic that the ink droplet ejection amounts ejected from the nozzles 10 other than those disposed at the both ends in the conveying direction of the nozzle array 9 are approximately the same, and the ink droplet ejection amounts ejected from the nozzles disposed at the both ends in the conveying direction of the nozzle array 9 are larger than the ink droplet ejection amounts ejected from the nozzles 10 other than those disposed at the both ends in the conveying direction.

That is, the second characteristics depicted in FIGS. 16A to 16D are such characteristics that the ink droplet ejection amount ejected from the nozzle 10 arranged at the center in the conveying direction of the nozzle array 9 is larger than the ink droplet ejection amounts ejected from the nozzles 10 disposed at the both ends in the conveying direction of the nozzle array 9 including the nozzles 10a, 10b, or the ink droplet ejection amount ejected from the nozzle 10 arranged at the center in the conveying direction of the nozzle array 9 is smaller than the ink droplet ejection amounts ejected from the nozzles 10 disposed at the both ends in the conveying direction of the nozzle array 9 including the nozzles 10a, 10b.

In the eighth modified embodiment, the controller 50 can receive the characteristic signal which indicates whether the ink-jet head 4 has the first characteristic or the second characteristic. Then, when the printer 1 is produced, for example, an operator inputs the characteristic signal by operating the operation unit 61 on the basis of a result of the execution of a test for the ink-jet head 4. The controller 50 receives the inputted characteristic signal. The information, which indicates whether the ink-jet head 4 has the first characteristic or the second characteristic, is stored in the flash memory 54 on the basis of the received characteristic signal.

Figure 17:
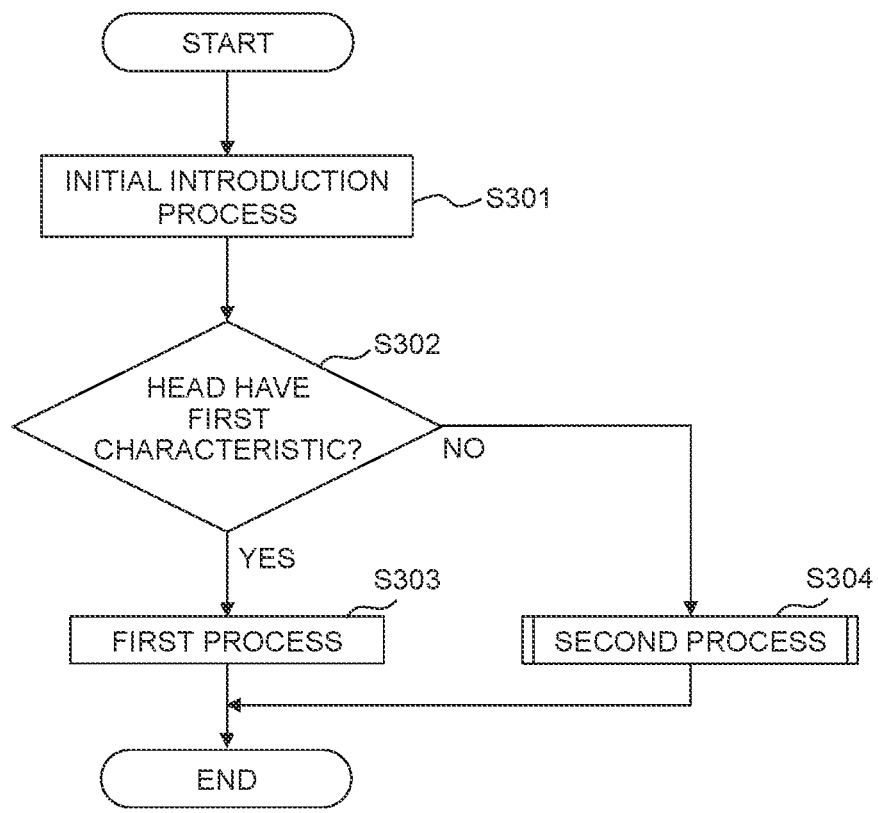
FIG. 17 is a flow chart illustrative of the flow of the process to be performed upon the initial startup when the nonuniformity correction pattern adapted to the characteristic of the ink-jet head is recorded.

Then, in the eighth modified embodiment, upon the initial startup of the printer 1, the controller 50 performs the process in accordance with a flow depicted in FIG. 17.

The procedure will be explained in more detail below. The controller 50 executes the initial introduction process (S301) in the same manner as S101 of the embodiment described above. Subsequently, the controller 50 judges whether or not the ink-jet head 4 has the first characteristic on the basis of the characteristic information stored in the flash memory 54 (S302).

If the ink-jet head 4 has the first characteristic (S302: YES), the first process is executed (S303). The first process is the process which is the same as or equivalent to S102 to S111 of the embodiment described above, and hence any detailed explanation thereof will be omitted herein.

If the ink-jet head 4 does not have the first characteristic, i.e., if the ink-jet head 4 has the second characteristic (S302: NO), then the second process is executed (S304).

Figure 18A:
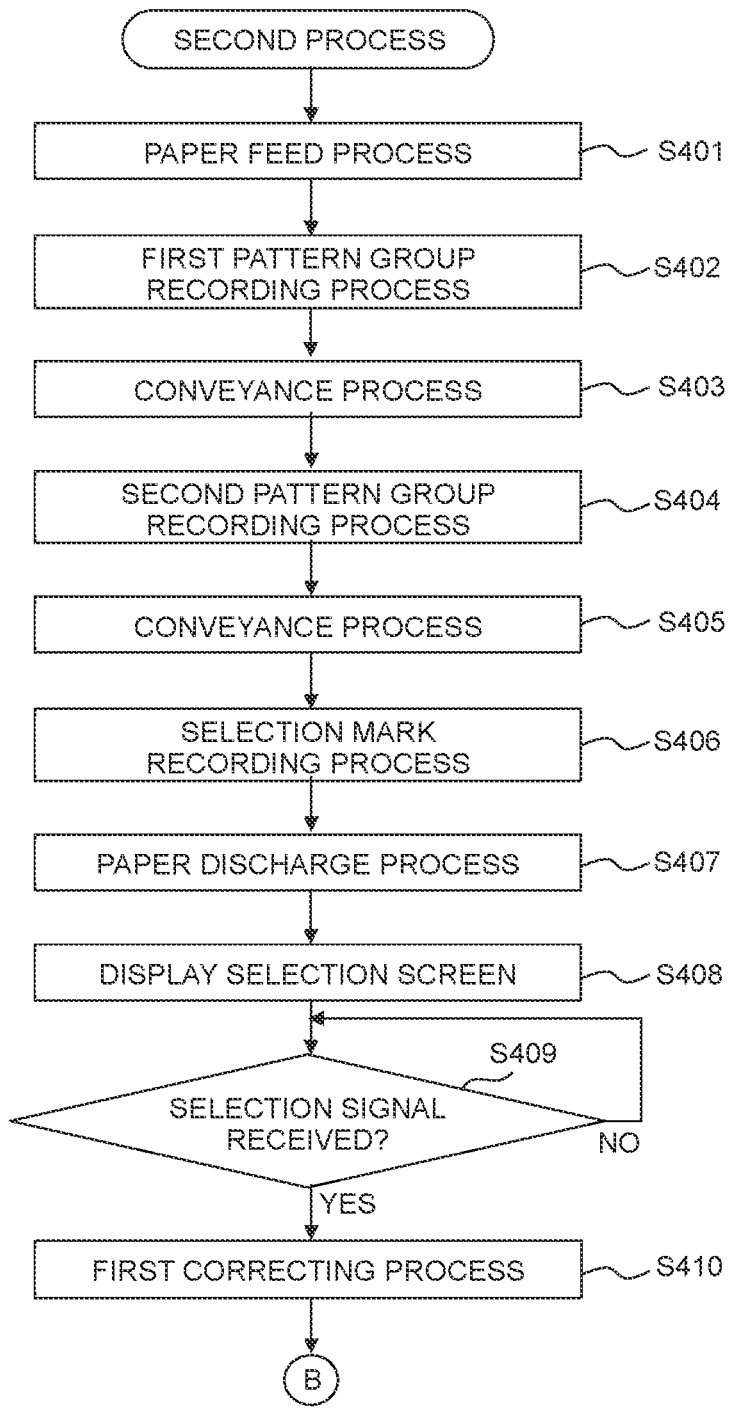
FIGS. 18A and 18B are a flow chart illustrative of the flow of the second process.
Figure 18B:
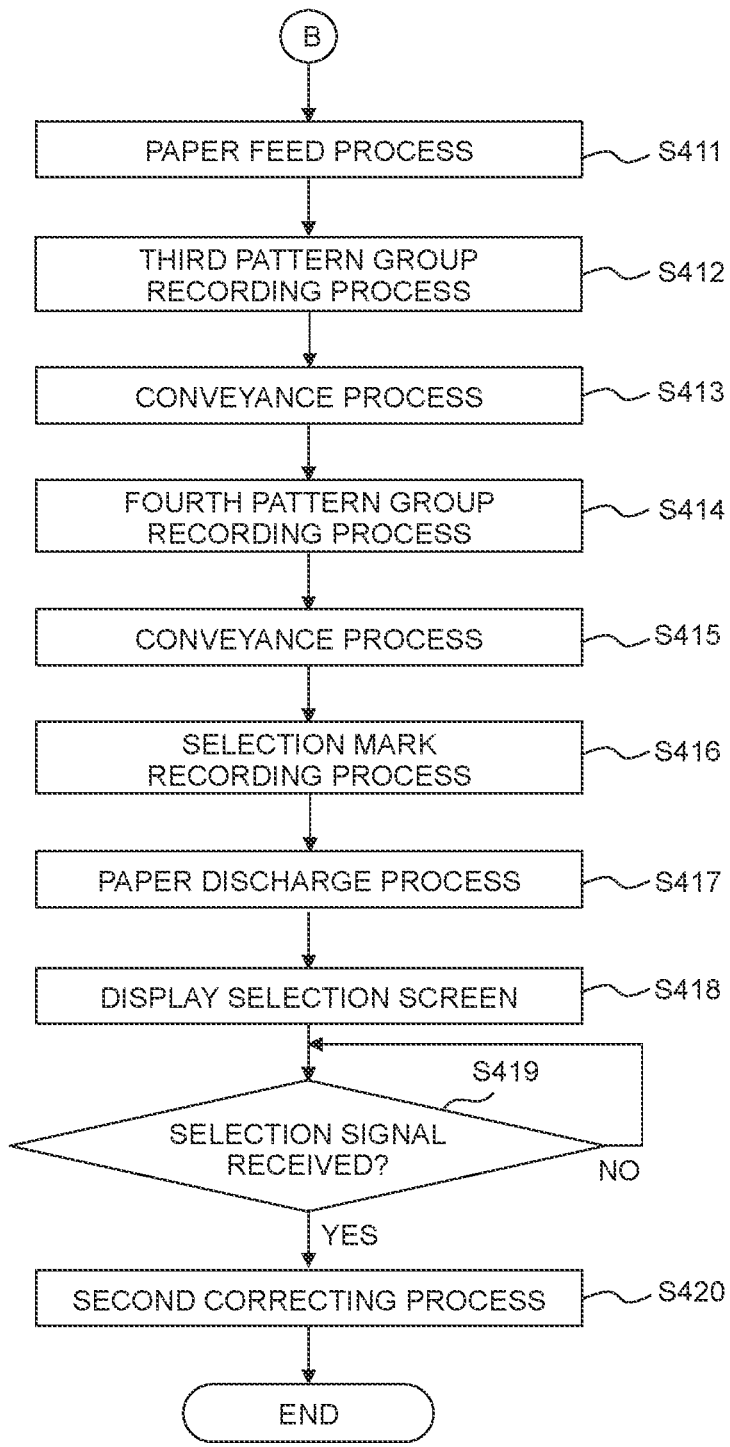
Figure 19:
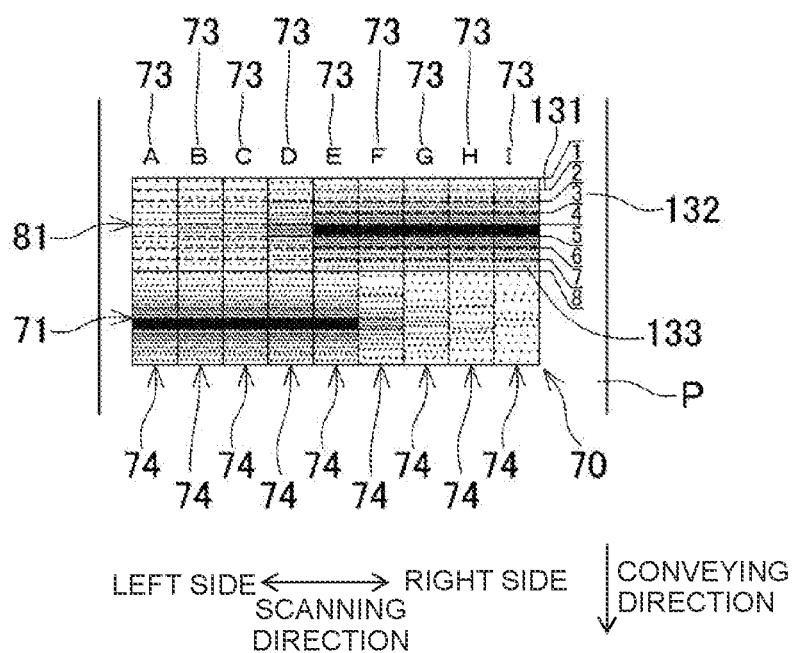
FIG. 19 is a drawing illustrative of the first nonuniformity correction pattern.

In the second process, the controller 50 performs the process in accordance with a flow depicted in FIGS. 18A and 18B. The procedure will be explained in more detail below. At first, the controller 50 executes the processes of S401 to S409 in the same manner as S102 to S110 of the embodiment described above. However, in the case of the eighth modified embodiment, as depicted in FIG. 19, the second pattern group 81 is recorded in the second pattern group recording process of S404. Further, a plurality of partition lines 131 for partitioning the second pattern portions 82A to 82I into a plurality of areas 133 in the conveying direction and a plurality of selection marks 132 for allowing the user to select the areas 133 partitioned by the partition lines 131 are recorded on the right side of the second pattern group 81. Note that the nonuniformity correction pattern 70 depicted in FIG. 19 is an example provided when the ink-jet head 4 has the characteristic as depicted in FIG. 16A. Further, in the eighth modified embodiment, the nonuniformity correction pattern 70, which is recorded by the first process or S401 to S404 of the second process, corresponds to the "first nonuniformity correction pattern" of the present teaching.

Further, in S408, the controller 50 displays, on the display unit 60, the selection screen in order to allow the user to select the area 133 (selection marks 132 of "1" to "8") in which the density arrives at the apex, of the plurality of areas 133 partitioned by the partition lines 131 of the second pattern portion, in addition to the selection of the pattern set 74 (selection marks 73 of "A" to "I") in which the smallest density difference is provided at the boundary between the first pattern portion and the second pattern portion. The phrase "density arrives at the apex" means that the density is most thickened or the density is most thinned. In this case, if the characteristic of the ink-jet head 4 is the characteristic as depicted in FIGS. 16A and 16B, the user is allowed to select one area 133. On the other hand, if the characteristic of the ink-jet head 4 is the characteristic as depicted in FIGS. 16C and 16D, the user is allowed to select a plurality of areas 133 which are aligned continuously. Note that if the nonuniformity correction pattern 70 is as depicted in FIG. 19, for example, then the selection mark 73 of "D" is selected, and the selection mark 132 of "5" is selected.

Then, if the user inputs the selection signal by selecting the selection marks 73, 132 as described above, the controller 50 receives the selection signal. In S409, it is judged whether or not the selection signal is received.

If the selection signal is received (S409: YES), the controller 50 executes the first correcting process (S410). The first correcting process is the process which is the same as or equivalent to the correcting process of S111 of the embodiment described above. Therefore, any detailed explanation thereof will be omitted herein.

Figure 20A:
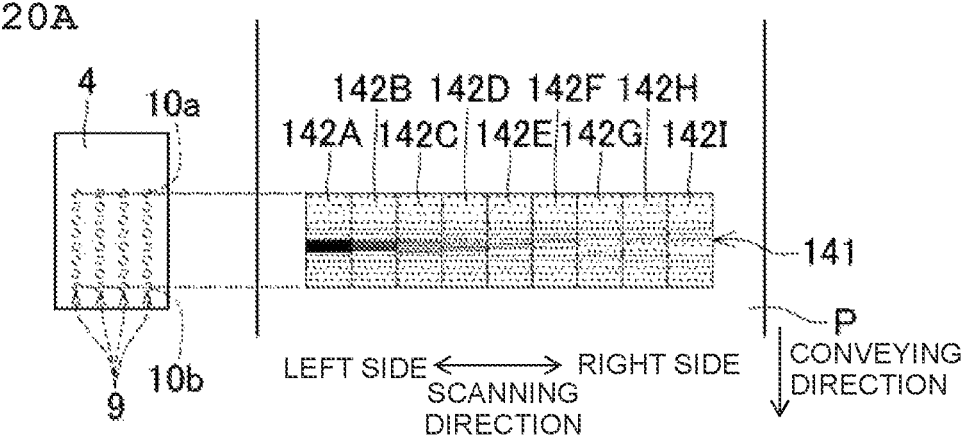
FIG. 20A is a drawing illustrative of the recording of the first pattern group of the second nonuniformity correction pattern.

Subsequently, the controller 50 executes the paper feed process (S411) in the same manner as S401, and then the controller 50 executes the third pattern group recording process (S412). In the third pattern group recording process, the controller 50 performs the recording pass, and thus the third pattern group 141 as depicted in FIG. 20A is recorded on the recording paper P.

The third pattern group 141 is composed of a plurality of third pattern portions 142A to 142I which are aligned adjacently in the scanning direction. The third pattern portions 142A to 142I are rectangular fill patterns. Note that in this embodiment, the third pattern portion 142E, which is included in the third pattern portions 142A to 142I and which is positioned at the center in the scanning direction, corresponds to the "reference third pattern portion" of the present teaching. Further, the third pattern portion 142I, which is disposed at the right end, corresponds to the "third pattern portion disposed at the outermost end on one side in the second direction". Further, the third pattern portion 142A, which is disposed at the left end, corresponds to the "third pattern portion disposed at the outermost end on the other side in the second direction".

Further, in the third pattern group recording process, the controller 50 operates to record the third pattern portions 142A to 142I on the recording paper P by ejecting the ink droplets from all of the nozzles 10 for constructing the nozzle arrays 9.

Further, in the third pattern group recording process, the ink droplets are ejected from the respective nozzles 10 in a state in which the ink droplet ejection amounts ejected from the upstream nozzles or the downstream nozzles are corrected in the first correcting process of S410.

Further, in the third pattern group recording process, the controller 50 operates as follows. That is, when the third pattern portions 142F to 142I, which are disposed on the right side from the third pattern portion 142E (having farther distances from the third pattern portions 142A), are recorded, the density is thinned in the area 133 (apex position) indicated by the selection signal received in S409 as compared with the third pattern portion 142E. Further, when the third pattern portion, which is disposed nearer to the right end, is recorded, the density is more thinned in the area 133 described above (apex position).

Further, in the third pattern group recording process, the controller 50 operates as follows. That is, when the third pattern portions 142A to 142D, which are disposed on the left side from the third pattern portion 142E (having farther distances from the third pattern portions 142I), are recorded, the density is thickened in the area 133 (apex position) indicated by the selection signal received in S409 as compared with the third pattern portion 142E. Further, when the third pattern portion, which is disposed nearer to the left end, is recorded, the density is more thickened in the area 133 described above (apex position).

Subsequently, the controller 50 executes the conveyance process (S413) in the same manner as S405, and then the controller 50 executes the fourth pattern group recording process (S414).

Figure 20B:
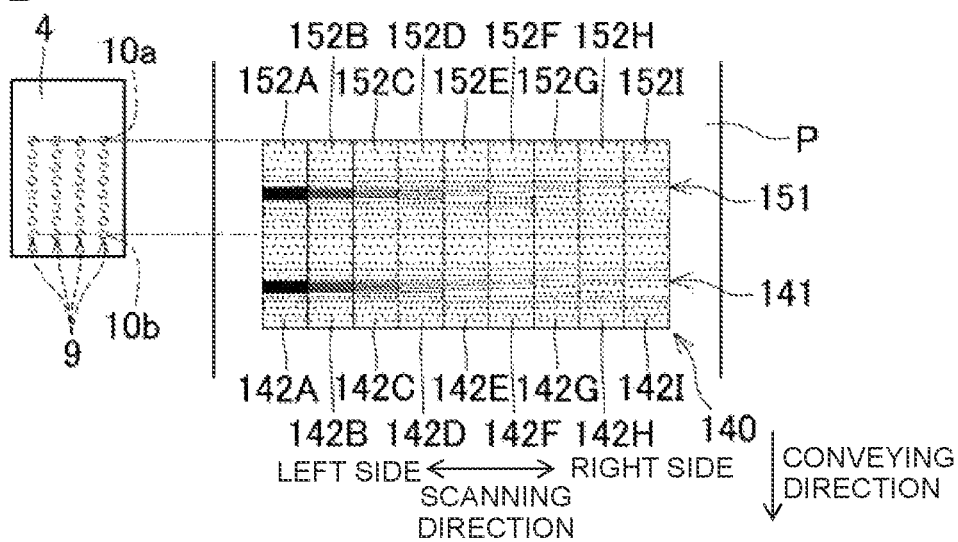
FIG. 20B is a drawing illustrative of the recording of the second pattern group of the second nonuniformity correction pattern.

In the fourth pattern group recording process, the controller 50 performs the recording pass, and thus the fourth pattern group 151 as depicted in FIG. 20B is recorded on the recording paper P. Accordingly, the nonuniformity correction pattern 140 ("second nonuniformity correction pattern" of the present teaching), which has the third pattern group 141 and the fourth pattern group 151, is recorded on the recording paper P.

The fourth pattern group 151 is composed of a plurality of fourth pattern portions 152A to 152I which are aligned adjacently in the scanning direction. The fourth pattern portions 152A to 152I are rectangular fill patterns. Further, the fourth pattern portions 152A to 152I are aligned adjacently on the upstream side in the conveying direction of the third pattern portions 142A to 142I respectively. Accordingly, the portions of the third pattern portions 142A to 142I recorded by the nozzles 10a and the portions of the fourth pattern portions 152A to 152I recorded by the nozzles 10b are adjacent to one another in the conveying direction.

Note that in the eighth embodiment, the fourth pattern portion 152E corresponds to the "reference fourth pattern portion" of the present teaching. Further, the fourth pattern portion 152I, which is disposed at the right end, corresponds to the "fourth pattern portion disposed at the outermost end on one side in the second direction". Further, the fourth pattern portion 152A, which is disposed at the left end, corresponds to the "fourth pattern portion disposed at the outermost end on the other side in the second direction".

Further, in the fourth pattern group recording process, the controller 50 operates to record the fourth pattern portions 152A to 152I on the recording paper P by ejecting the ink droplets from all of the nozzles 10 for constructing the nozzle arrays 9.

Further, in the fourth pattern group recording process, the ink droplets are ejected from the respective nozzles 10 in a state in which the ink droplet ejection amounts ejected from the upstream nozzles or the downstream nozzles are corrected in the first correcting process of S410.

Further, in the fourth pattern group recording process, the controller 50 operates as follows. That is, when the fourth pattern portions 152F to 152I, which are disposed on the right side from the fourth pattern portion 152E (having farther distances from the fourth pattern portions 152A), are recorded, the density is thinned in the area 133 (apex position) indicated by the selection signal received in S409 as compared with the fourth pattern portion 152E. Further, when the fourth pattern portion, which is disposed nearer to the right end, is recorded, the density is more thinned in the area 133 described above (apex position).

Further, in the fourth pattern group recording process, the controller 50 operates as follows. That is, when the fourth pattern portions 152A to 152D, which are disposed on the left side from the fourth pattern portion 152E (having farther distances from the fourth pattern portions 152I), are recorded, the density is thickened in the area 133 (apex position) indicated by the selection signal as compared with the fourth pattern portion 152E. Further, when the fourth pattern portion, which is disposed nearer to the left end, is recorded, the density is more thickened in the area 133 described above (apex position).

Figure 20C:
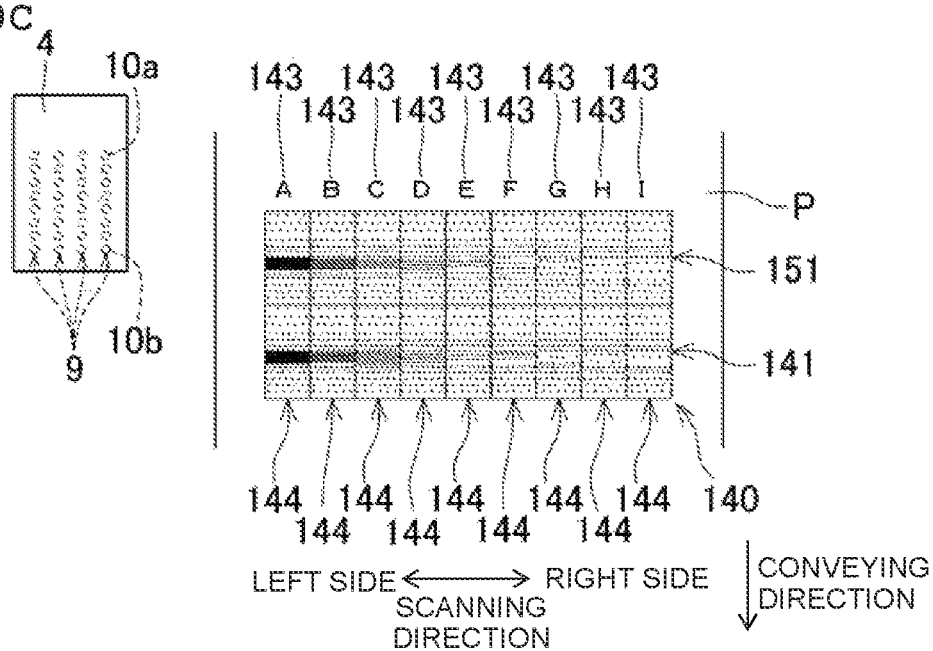
FIG. 20C is a drawing illustrative of the recording of the selection marks of the second nonuniformity correction pattern.

Subsequently, the controller 50 executes the conveyance process (S415) in the same manner as S106 of the embodiment described above, and then the controller 50 executes the selection mark recording process (S416) in the same manner as S107 of the embodiment described above to record a plurality of selection marks 143 in order to allow the user to select the pattern set 144 of the third pattern portion and the fourth pattern portion aligned in the conveying direction as depicted in FIG. 20C. Subsequently, the controller 50 executes the paper discharge process (S417) in the same manner as S108.

Subsequently, the controller 50 allows the display unit 60 to display the selection screen (S418) in order to allow the user to select the pattern set 144 which has the most uniform densities. Then, the controller 50 waits until the selection signal, which selects the pattern set 144, is inputted in accordance with the operation of the operation unit 61 performed by the user, and the controller 50 receives the selection signal (S419: NO).

Then, if the selection signal is received (S419: YES), the controller 50 executes the second correcting process (S420). In the second correcting process, if the selection signal indicates the pattern set 144 of the third pattern portion 142E and the fourth pattern portion 152E (if "E" is selected), then the controller 50 does not perform any further correction in relation to the ink droplet ejection amount ejected from the nozzles 10.

Further, in the second correcting process, if the selection signal indicates the pattern set 144 disposed on the left side from the pattern set 144 of the third pattern portion 142E and the fourth pattern portion 152E (if any one of "A" to "D" is selected), then the controller 50 performs the correction such that the ink droplet ejection amount ejected from the nozzle 10 used for the recording of the apex position is more decreased when the pattern set 144 indicated by the selection signal is the pattern set 144 disposed nearer to the left end.

Further, in the second correcting process, if the selection signal indicates the pattern set 144 disposed on the right side from the pattern set 144 of the third pattern portion 142E and the fourth pattern portion 152E (if any one of "F" to "I" is selected), then the controller 50 performs the correction such that the ink droplet ejection amount ejected from the nozzle 10 used for the recording of the apex position is more increased when the pattern set 144 indicated by the selection signal is the pattern set 144 disposed nearer to the right end.

In the eighth modified embodiment, even when the ink-jet head 4 has any one of the first characteristic and the second characteristic as the characteristic relevant to the dispersion in the ink droplet ejection amount among the plurality of nozzles 10 of the nozzle arrays 9, then the nonuniformity correction pattern adapted to the characteristic can be recorded, and it is possible to correct the dispersion in the ink droplet ejection amount among the nozzles on the basis of the recording result.

Further, as the characteristic of the dispersion in the ink droplet ejection amount among the plurality of nozzles 10, the ink-jet head 4 has, in some cases, such a characteristic that the ink droplet ejection amount is gradually decreased or gradually increased at positions separated farther from the nozzle 10a to approach the nozzle 10b in the conveying direction, when the ink-jet head 4 is driven by the same signal in relation to the plurality of nozzles 10. In view of the above, in the eighth modified embodiment, the characteristic as described above is designated as the first characteristic. Then, if the ink-jet head 4 has the first characteristic, then the nonuniformity correction pattern 70 is recorded, and the ink droplet ejection amount ejected from the nozzle 10 is corrected on the basis of the recording result thereof.

Further, as the characteristic of the dispersion in the ink droplet ejection amount among the plurality of nozzles 10, the ink-jet head 4 has, in some cases, such a characteristic that the ink droplet ejection amount ejected from the nozzle 10 arranged at the center in the conveying direction and included in the plurality of nozzles 10 is increased as compared with the ink droplet ejection amounts ejected from the nozzles 10a, 10b or decreased as compared with the ink droplet ejection amounts ejected from the nozzles 10a, 10b, when the ink-jet head 4 is driven by the same signal in relation to the plurality of nozzles 10. In view of the above, in the eighth modified embodiment, the characteristic as described above is designated as the second characteristic. Then, if the ink-jet head 4 has the second characteristic, then the nonuniformity correction patterns 70, 140 are recorded, and the ink droplet ejection amount ejected from the nozzle 10 is corrected on the basis of the recording result thereof.

Figure 21:
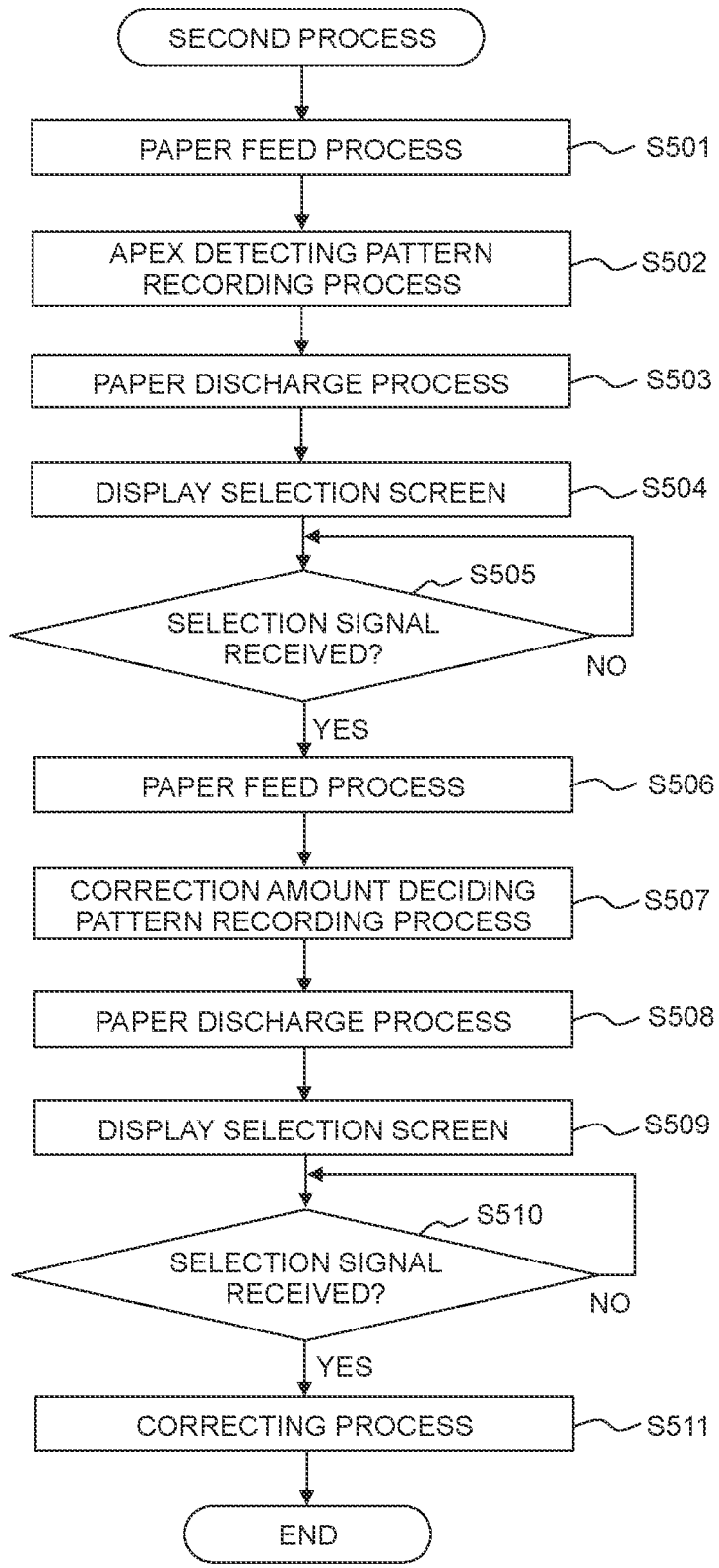
FIG. 21 is a flow chart illustrative of the flow of the second process when an apex detecting pattern and a correction amount deciding pattern are recorded.

Further, the second process is not limited to the process of the eighth modified embodiment. In a ninth modified embodiment, the controller 50 performs the process in accordance with a flow depicted in FIG. 21 in relation to the second process.

Figure 22A:
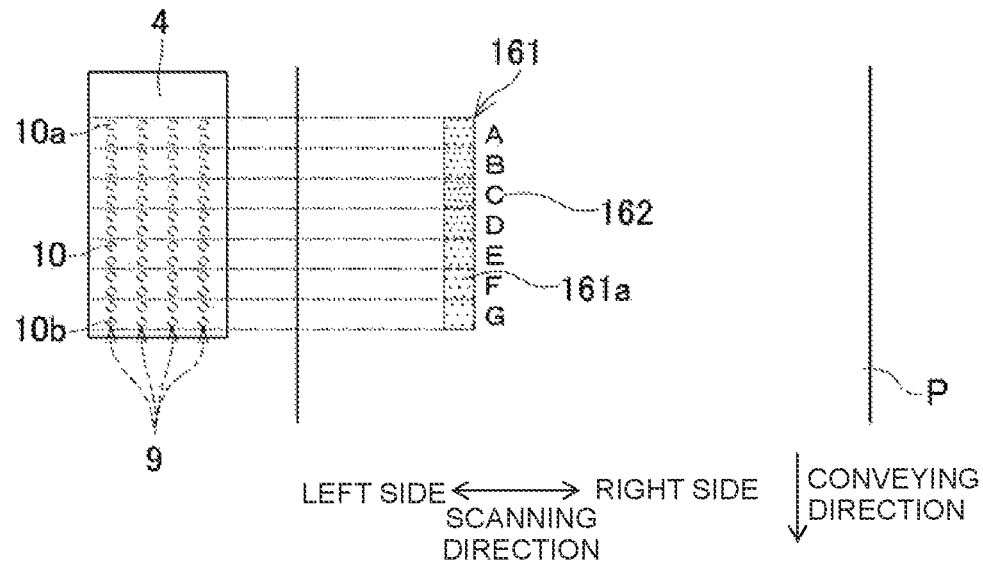
FIG. 22A is a drawing illustrative of the apex detecting pattern.

The procedure will be explained in more detail below. At first, in the second process of the ninth modified embodiment, the controller 50 executes the paper feed process (S501) in the same manner as S101 of the embodiment described above. Subsequently, the controller 50 executes the apex detecting pattern recording process (S502). In the apex detecting pattern recording process, the controller 50 operates to record an apex detecting pattern 161 and a plurality of selection marks 162 as depicted in FIG. 22A on the recording paper P by performing the recording pass.

The apex detecting pattern 161 is a band-shaped pattern extending in the conveying direction. The apex detecting pattern 161 is recorded by ejecting the ink droplets by driving the ink-jet head 4 with the same driving signal for all of the nozzles 10 for constructing the nozzle arrays 9 in the recording pass. The plurality of selection marks 162 are provided in order to allow the user to select a plurality of areas 161a obtained by dividing the apex detecting pattern 161 in the conveying direction. The plurality of selection marks 162 are recorded so that the plurality of selection marks 162 are adjacent to the respective areas 161a in the scanning direction.

Subsequently, the controller 50 executes the paper discharge process (S503) in the same manner as S109 of the embodiment described above. Subsequently, the controller 50 displays the selection screen on the display unit 60 in order to allow the user to select the area 161a (selection mark 162 of "A" to "I") in which the density arrives at the apex. The selection signal, which selects the area 161a (selection mark 162), is inputted in accordance with the operation of the operation unit 61 performed by the user. The controller 50 waits until the controller 50 receives the selection signal (S505: NO).

In this procedure, if the characteristic of the ink-jet head 4 is the characteristic as depicted in FIGS. 16A and 16B, the user is allowed to select one area 161a. On the other hand, if the characteristic of the ink-jet head 4 is the characteristic as depicted in FIGS. 16C and 16D, the user is allowed to select the plurality of areas 161a which are aligned continuously.

Note that the apex detecting pattern 161 depicted in FIG. 22A is an example provided when the characteristic of the ink-jet head 4 is the characteristic as depicted in FIG. 16A. For example, the area 161a, which corresponds to the selection mark 162 of "C", is selected.

Figure 22B:
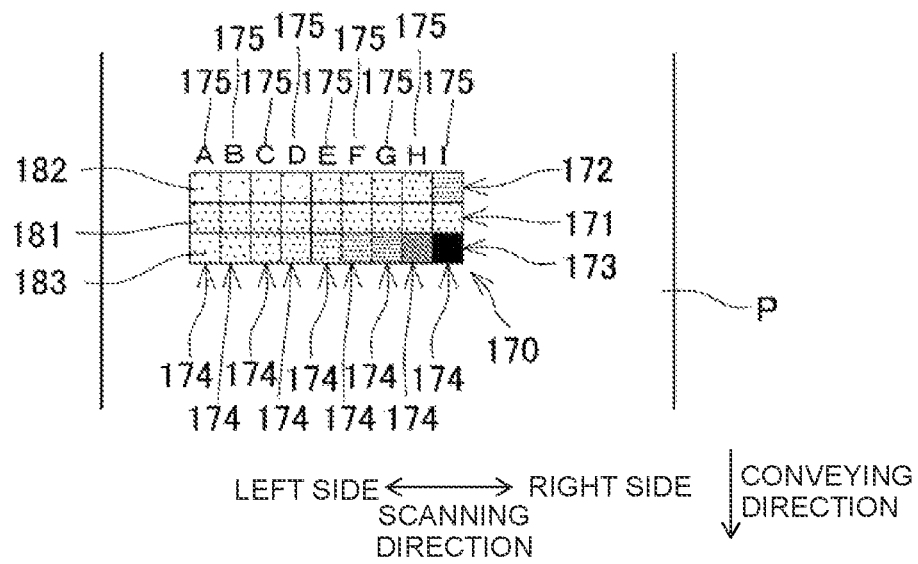
FIG. 22B is a drawing illustrative of the correction amount deciding pattern.

If the controller 50 receives the selection signal (S505: YES), the controller 50 executes the paper feed process (S506). Subsequently, the controller 50 executes the correction amount deciding pattern recording process (S507). In the correction amount deciding pattern recording process, the recording pass and the conveyance action are repeatedly performed to thereby record a correction amount deciding pattern 170 and a plurality of selection marks 175 as depicted in FIG. 22B. Note that in the ninth modified embodiment, the apex detecting pattern 161 and the correction amount deciding pattern 170 correspond to the "second nonuniformity correction pattern" of the present teaching.

The correction amount deciding pattern 170 has three pattern groups 171 to 173. The pattern group 171 has a plurality of pattern portions 181 which are aligned in the scanning direction. The plurality of pattern portions 181 are recorded by the nozzles 10 used to record the area 161a disposed on the most upstream side in the conveying direction of the apex detecting pattern 161 (area 161a corresponding to the selection mark 162 of "A" depicted in FIG. 22A) respectively. Further, each of the densities of the plurality of pattern portions 181 is the same as the density of the area 161a disposed on the most upstream side in the conveying direction of the apex detecting pattern 161.

The pattern group 172 adjoins on the upstream side in the conveying direction of the pattern group 171. The pattern group 172 has a plurality of pattern portions 182 which are aligned in the scanning direction. The plurality of pattern portions 182 are recorded by the nozzles 10 used to record the area 161a disposed on the most downstream side in the conveying direction of the apex detecting pattern 161 (area 161a corresponding to the selection mark 162 of "I" depicted in FIG. 22A) respectively. Further, the pattern portion 182 positioned at the center in the scanning direction, which is included in the plurality of pattern portions 182, has the density that is the same as the density of the area 161a disposed on the most downstream side in the conveying direction of the apex detecting pattern 161. Further, the pattern portions 182, which are disposed nearer to the right end as compared with the foregoing pattern portion 182, have the thicker densities, and the pattern portions 182, which are disposed nearer to the left end as compared with the foregoing pattern portion 182, have the thinner densities.

The pattern group 173 adjoins on the downstream side in the conveying direction of the pattern group 171. The pattern group 173 has a plurality of pattern portions 183 which are aligned in the scanning direction. The plurality of pattern portions 183 are recorded by the nozzles 10 used to record the area 161a indicated by the selection signal received in S504 respectively. Further, the pattern portion 183 positioned at the center in the scanning direction, which is included in the plurality of pattern portions 183, has the density that is the same as the density of the area 161a indicated by the selection signal received in S504. Further, the pattern portions 183, which are disposed nearer to the right end as compared with the foregoing pattern portion 183, have the thicker densities, and the pattern portions 183, which are disposed nearer to the left end as compared with the foregoing pattern portion 183, have the thinner densities.

The plurality of selection marks 175 are provided in order to allow the user to select the array 174 of the pattern portion 181, the pattern portion 182, and the pattern portion 183 aligned in the conveying direction. The plurality of selection marks 175 are arranged adjacently in the conveying direction to the respective arrays 174.

Subsequently, the controller 50 executes the paper discharge process (S508). Subsequently, the controller 50 operates such that the selection screen is displayed on the display unit 60 (S509) in order to select the array 174 having the smallest density difference between the pattern portion 181 and the pattern portion 182 and the array 174 having the smallest density difference between the pattern portion 181 and the pattern portion 183 respectively. The selection signal for selecting the array 174 (selection mark 175) is inputted in accordance with the operation of the operation unit 61 performed by the user. The controller 50 waits until the controller 50 receives the selection signal (S510: NO).

Note that the correction amount deciding pattern 170 depicted in FIG. 22B is an example provided when the apex detecting pattern 161 is as depicted in FIG. 22A. In this case, for example, the array 174, which corresponds to the selection mark 175 of "G", is selected as the array 174 having the smallest density difference between the pattern portion 181 and the pattern portion 182. Further, the array 174, which corresponds to the selection mark 175 of "C", is selected as the array 174 having the smallest density difference between the pattern portion 181 and the pattern portion 183.

If the controller 50 receives the selection signal (S510: YES), the controller 50 executes the correcting process to correct the ink droplet ejection amount ejected from the nozzle 10 (S511). In this procedure, in the ninth modified embodiment, it is possible to obtain the information of the position in the conveying direction at which the ejection amount arrives at the apex in relation to the nozzle array 9 on the basis of the selection signal received in S505. Further, it is possible to obtain the information of the difference in the ejection amount between the nozzle 10a and the nozzle 10b on the basis of the selection signal received in S510 which indicates the array 174 having the smallest density difference between the pattern portion 181 and the pattern portion 182. Further, it is possible to obtain the information of the difference in the ejection amount between the nozzle 10a and the nozzle 10 in which the ejection amount arrives at the apex, on the basis of the selection signal which indicates the array 174 having the smallest density difference between the pattern portion 181 and the pattern portion 183. Then, in S510, the ink droplet ejection amount ejected from the nozzle 10 is corrected on the basis of the information as described above.

Further, the second characteristic is not limited to the characteristics as depicted in FIGS. 16A to 16D. When the ink-jet head 4 has any second characteristic different from those depicted in FIGS. 16A to 16D, then the second nonuniformity correction pattern corresponding to the second characteristic may be recorded in accordance with the second process, and the ink droplet ejection amount ejected from the nozzle 10 may be corrected on the basis of the recording result.

Further, the first characteristic is not limited to the characteristic explained above as well. When the ink-jet head 4 has the first characteristic irrelevant to the characteristic type of the first characteristic and the second characteristic, then the first nonuniformity correction pattern corresponding to the first characteristic may be recorded, and the ink droplet ejection amount ejected from the nozzle 10 may be corrected on the basis of the recording result. When the ink-jet head 4 has the second characteristic, then the second nonuniformity correction pattern corresponding to the second characteristic may be recorded, and the ink droplet ejection amount ejected from the nozzle 10 may be corrected on the basis of the recording result.

Also in this case, whether the ink-jet head 4 has either the first characteristic or the second characteristic as the characteristic in relation to the dispersion in the ink droplet ejection amount among the plurality of nozzles 10 in the nozzle array 9, then the nonuniformity correction pattern corresponding to the characteristic is recorded, and it is possible to correct the dispersion in the ink droplet ejection amount among the nozzles 10 on the basis of the recording result.

Further, in the exemplary case described above, the ink-jet head 4 and the recording paper P are relatively moved in the conveying direction in accordance with the conveyance of the recording paper P in the conveying direction by means of the conveying rollers 6, 7. However, there is no limitation thereto. For example, the following configuration is also available. That is, a movement mechanism ("relative movement mechanism" of the present teaching) is provided, which moves the carriage 2 for carrying the ink-jet head 4 in the conveying direction. The carriage 2 is moved in the conveying direction, and thus the ink-jet head 4 and the recording paper P are relatively moved in the conveying direction. Alternatively, the following configuration is also available. That is, both of the ink-jet head 4 and the recording paper P are moved in the conveying direction, and thus the ink-jet head 4 and the recording paper P are relatively moved in the conveying direction. Note that in this case, the carriage 2 and the movement mechanism as described above correspond to the "relative movement mechanism" of the present teaching.

Further, the foregoing explanation has been made for the exemplary case in which the present teaching is applied to the printer provided with the so-called serial head for ejecting the ink from the plurality of nozzles while making movement in the scanning direction together with the carriage. However, there is no limitation thereto. For example, the present teaching is also applicable to a printer provided with a so-called line head which extends over the entire length of the recording paper P in the scanning direction.

In the case of the line head, a plurality of nozzles are arranged in the direction orthogonal to the conveying direction of the recording paper, in addition to which a plurality of nozzles are also arranged in the conveying direction in some cases, for example, in order to realize the high speed recording. Also in such a case, the nonuniformity correction pattern is recorded in the same manner as explained above. The ink droplet ejection amount ejected from the nozzles 10 is corrected on the basis of the recording result. Thus, it is possible to reduce the dispersion in the ink droplet ejection amount among the plurality of nozzles arranged in the conveying direction.

Further, the foregoing explanation has been made for the exemplary case in which the present teaching is applied to the printer for performing the recording on the recording paper P by ejecting the ink from the nozzles. However, there is no limitation thereto. The present teaching may be also applied to any printer for recording an image on a recording medium other than the recording paper including, for example, T-shirts, sheets for outdoor advertisements, cases for portable terminals such as smartphones or the like, corrugated cardboards, and resin members. Further, the present teaching may be also applied to any liquid droplet ejecting apparatus for ejecting any liquid other than the ink, including, for example, resins and metals which are in liquid states.

What is claimed is:

1. A liquid droplet ejecting apparatus comprising:
a liquid droplet ejecting head which has a nozzle array composed of a plurality of nozzles aligned in a first direction;
a relative movement mechanism which is configured to relatively move the liquid droplet ejecting head and a recording medium in the first direction; and
a controller,
wherein the controller is configured to record, on the recording medium, a nonuniformity correction pattern in order to correct any dispersion in liquid droplet ejection amount among the plurality of nozzles, by controlling the liquid droplet ejecting head and the relative movement mechanism,
in a case of recording the nonuniformity correction pattern, the controller is configured to:
control the liquid droplet ejecting head to eject liquid droplets from at least a first nozzle to thereby record a first pattern group which is composed of a plurality of first pattern portions aligned in a second direction intersecting with the first direction, the first nozzle being an outermost end nozzle disposed on one side in the first direction of the nozzle array, the first pattern group being a part of the nonuniformity correction pattern;
control the relative movement mechanism to relatively move the liquid droplet ejecting head and the recording medium in the first direction by a predetermined distance; and
control the liquid droplet ejecting head to eject the liquid droplets from at least a second nozzle to thereby record a second pattern group which is composed of a plurality of second pattern portions aligned in the second direction, the second nozzle being an outermost end nozzle disposed on the other side in the first direction of the nozzle array, the second pattern group being a part of the nonuniformity correction pattern,
portions, which are recorded by the second nozzle and included in the plurality of second pattern portions, are adjacent in the first direction to portions, which are recorded by the first nozzle and included in the plurality of first pattern portions,
the first pattern group includes a reference first pattern portion which is positioned between the first pattern portion disposed at an outermost end on one side in the second direction and the first pattern portion disposed at another outermost end on the other side in the second direction,
the second pattern group includes a reference second pattern portion which is positioned between the second pattern portion disposed at an outermost end on one side in the second direction and the second pattern portion disposed at another outermost end on the other side in the second direction, the reference second pattern portion being adjacent to the reference first pattern portion in the first direction,
in a case of recording the first pattern group, the controller is configured to control the liquid droplet ejecting head such that the first pattern portion disposed at the outermost end on one side in the second direction has a density which is thinned as compared with a density of the reference first pattern portion, and
in a case of recording the second pattern group, the controller is configured to control the liquid droplet ejecting head such that the second pattern portion disposed at the outermost end on the other side in the second direction has a density which is thinned as compared with a density of the reference second pattern portion.

2. The liquid droplet ejecting apparatus according to claim 1, wherein the controller is configured such that:
the first nozzle group of the nozzle array is allowed to eject the liquid droplets therefrom by controlling the liquid droplet ejecting head when the first pattern group is recorded; and the second nozzle group of the nozzle array is allowed to eject the liquid droplets therefrom by controlling the liquid droplet ejecting head when the second pattern group is recorded;

the first nozzle group being composed of a plurality of nozzles including the first nozzle and aligned continuously in the first direction; and the second nozzle group being composed of a plurality of nozzles including the second nozzle and aligned continuously in the first direction.

3. The liquid droplet ejecting apparatus according to claim 2, wherein:

the plurality of nozzles for constructing the first nozzle group are positioned on one side in the first direction as compared with the nozzle positioned at a center in the first direction of the nozzle array; and the plurality of nozzles for constructing the second nozzle group are positioned on the other side in the first direction as compared with the nozzle positioned at the center in the first direction of the nozzle array.

4. The liquid droplet ejecting apparatus according to claim 2, wherein the nozzle array includes at least one nozzle which is positioned between the first nozzle group and the second nozzle group in the first direction.

5. The liquid droplet ejecting apparatus according to claim 1, wherein:

the first pattern group includes a plurality of first pattern portions which are positioned farther from the first pattern portion disposed at the outermost end on the other side in the second direction as compared with the reference first pattern portion;

the second pattern group includes a plurality of second pattern portions which are positioned farther from the second pattern portion disposed at the outermost end on one side in the second direction as compared with the reference second pattern portion;

the controller is configured such that the densities are more thinned for the first pattern portions positioned farther from the first pattern portion disposed at the outermost end on the other side in the second direction by controlling the liquid droplet ejecting head when the plurality of first pattern portions positioned farther from the first pattern portion disposed at the outermost end on the other side in the second direction as compared with the reference first pattern portion are recorded; and the controller is configured such that the densities are more thinned for the second pattern portions positioned farther from the second pattern portion disposed at the outermost end on one side in the second direction by controlling the liquid droplet ejecting head when the plurality of second pattern portions positioned farther from the second pattern portion disposed at the outermost end on one side in the second direction as compared with the reference second pattern portion are recorded.

6. The liquid droplet ejecting apparatus according to claim 5, wherein:

the controller is configured such that the densities of the first pattern portions are more thinned in a direction directed from the second nozzle to the first nozzle by controlling the liquid droplet ejecting head when the first pattern portions positioned farther from the first pattern portion disposed at the outermost end on the other side in the second direction as compared with the reference first pattern portion are recorded;

the controller is configured such that the densities of the first pattern portions are more thinned in a direction directed from the first nozzle to the second nozzle by controlling the liquid droplet ejecting head when the first pattern portions positioned farther from the first pattern portion disposed at the outermost end on one side in the second direction as compared with the reference first pattern portion are recorded;

the controller is configured such that the densities of the second pattern portions are more thinned in the direction directed from the second nozzle to the first nozzle by controlling the liquid droplet ejecting head when the second pattern portions positioned farther from the second pattern portion disposed at the outermost end on the other side in the second direction as compared with the reference second pattern portion are recorded; and the controller is configured such that the densities of the second pattern portions are more thinned in the direction directed from the first nozzle to the second nozzle by controlling the liquid droplet ejecting head when the second pattern portions positioned farther from the second pattern portion disposed at the outermost end on one side in the second direction as compared with the reference second pattern portion are recorded.

7. The liquid droplet ejecting apparatus according to claim 5, wherein:

the controller is configured such that the densities are thinned by controlling the liquid droplet ejecting head to more decrease at least an ejection amount from the first nozzle per unit area for the first pattern portions positioned farther from the first pattern portion disposed at the outermost end on the other side in the second direction when the plurality of first pattern portions positioned farther from the first pattern portion disposed at the outermost on the other side in the second direction end as compared with the reference first pattern portion are recorded; and the controller is configured such that the densities are thinned by controlling the liquid droplet ejecting head to more decrease at least an ejection amount from the second nozzle per unit area for the second pattern portions positioned farther from the second pattern portion disposed at the outermost end on one side in the second direction when the plurality of second pattern portions positioned farther from the second pattern portion disposed at the outermost end on one side in the second direction as compared with the reference second pattern portion are recorded.

8. The liquid droplet ejecting apparatus according to claim 7, wherein:

the controller is configured such that the liquid droplet ejecting head is controlled to thin out some ejecting actions of liquid droplet ejecting actions from the plurality of nozzles on the basis of mask data when the plurality of first pattern portions positioned farther from the first pattern portion disposed at the outermost end on the other side in the second direction as compared with the reference first pattern portion and the plurality of second pattern portions positioned farther from the second pattern portion disposed at the outermost end on one side in the second direction as compared with the reference second pattern portion are recorded;

the controller is configured such that the liquid droplet ejecting head is controlled to thin out the liquid droplet ejecting actions on the basis of the mask data in which a thinning out rate as a ratio for thinning out the liquid droplet ejecting actions is higher for the first pattern portions positioned farther from the first pattern portion disposed at the outermost end on the other side in the second direction when the plurality of first pattern portions positioned farther from the first pattern portion disposed at the outermost end on the other side in the second direction as compared with the reference first pattern portion are recorded; and the controller is configured such that the liquid droplet ejecting head is controlled to thin out the liquid droplet ejecting actions on the basis of the mask data in which the thinning out rate is higher for the second pattern portions positioned farther from the second pattern portion disposed at the outermost end on one side in the second direction when the plurality of second pattern portions positioned farther from the second pattern portion disposed at the outermost end on one side in the second direction as compared with the reference second pattern portion are recorded.

9. The liquid droplet ejecting apparatus according to claim 7, wherein:

the liquid droplet ejecting head is configured such that any one of the liquid droplets of a plurality of types having different volumes is selectively ejected from the plurality of nozzles respectively;

the controller is configured such that the liquid droplet ejecting head is controlled to eject the liquid droplets from at least the first nozzle such that an ejecting ratio of the liquid droplets having the small volume of the liquid droplets of the plurality of types is more raised for the first pattern portions positioned farther from the first pattern portion disposed at the outermost end on the other side in the second direction when the plurality of first pattern portions positioned farther from the first pattern portion disposed at the outermost end on the other side in the second direction as compared with the reference first pattern portion are recorded; and the controller is configured such that the liquid droplet ejecting head is controlled to eject the liquid droplets from at least the second nozzle such that the ejecting ratio of the liquid droplets having the small volume of the liquid droplets of the plurality of types is more raised for the second pattern portions positioned farther from the second pattern portion disposed at the outermost end on one side in the second direction when the plurality of second pattern portions positioned farther from the second pattern portion disposed at the outermost end on one side in the second direction as compared with the reference second pattern portion are recorded.

10. The liquid droplet ejecting apparatus according to claim 1, wherein the relative movement mechanism is provided with:

a first conveying roller which conveys the recording medium in the first direction while interposing the recording medium; and a second conveying roller which is arranged separately from the first conveying roller in the first direction and which conveys the recording medium in the first direction while interposing the recording medium;

the liquid droplet ejecting head is positioned between the first conveying roller and the second conveying roller in the first direction; and the controller is configured to record the nonuniformity correction pattern in a state in which the recording medium is interposed by both of the first conveying roller and the second conveying roller.

11. The liquid droplet ejecting apparatus according to claim 1, wherein:

the controller acquires information of a density optimum position on the basis of a recording result of the nonuniformity correction pattern, the density optimum position being a position in the second direction at which a smallest density difference is provided between the first pattern portion and the second pattern portion which are adjacent to one another in the first direction;

the controller is configured such that the liquid droplet ejecting head and the relative movement mechanism are controlled on the basis of the information of the density optimum position to record the nonuniformity correction pattern again; and the controller is configured, in order to record the nonuniformity correction pattern again, such that:

the controller is configured such that the first pattern portion, which has been positioned at the density optimum position in the nonuniformity correction pattern recorded previously, is reset as the reference first pattern portion, the second pattern portion, which has been positioned at the density optimum position in the nonuniformity correction pattern recorded previously, is reset as the reference second pattern portion;

the controller is configured to control the liquid droplet ejecting head such that a density difference between the reset reference first pattern portion and the first pattern portion adjacent thereto and a density difference between the adjoining first pattern portions positioned farther from the first pattern portion disposed at the outermost end on the other side in the second direction as compared with the reset reference first pattern portion are decreased as compared with the nonuniformity correction pattern recorded previously; and the controller is configured to control the liquid droplet ejecting head such that a density difference between the reset reference second pattern portion and the second pattern portion adjacent thereto and a density difference between the adjoining second pattern portions positioned farther from the second pattern portion disposed at the outermost end on one side in the second direction as compared with the reset reference second pattern portion are decreased as compared with the nonuniformity correction pattern recorded previously.

12. The liquid droplet ejecting apparatus according to claim 1, wherein:

the controller acquires information of a density optimum position on the basis of a recording result of the nonuniformity correction pattern, the density optimum position being a position in the second direction at which a smallest density difference is provided between the first pattern portion and the second pattern portion which are adjacent to one another in the first direction;

the controller is configured to perform at least one of correction to decrease the liquid droplet ejection amount from the first nozzle and correction to increase the liquid droplet ejection amount from the second nozzle if the density optimum position is positioned farther from the first pattern portion disposed at the outermost end on the other side in the second direction and the second pattern portion disposed at the outermost end on the other side in the second direction as compared with the reference first pattern portion and the reference second pattern portion; and the controller is configured to perform at least one of correction to decrease the liquid droplet ejection amount from the second nozzle and correction to increase the liquid droplet ejection amount from the first nozzle if the density optimum position is positioned farther from the first pattern portion disposed at the outermost end on one side in the second direction and the second pattern portion disposed at the outermost end on one side in the second direction as compared with the reference first pattern portion and the reference second pattern portion.

13. The liquid droplet ejecting apparatus according to claim 1, further comprising:
an input unit which allows a user to input a signal in relation to a recording result of the nonuniformity correction pattern, wherein:
the controller is configured to correct the liquid droplet ejection amount from at least one of the first nozzle and the second nozzle on the basis of the signal inputted from the input unit.

14. The liquid droplet ejecting apparatus according to claim 1, wherein:
the controller is configured to be capable of receiving a characteristic signal which indicates whether the liquid droplet ejecting head has a first characteristic or a second characteristic that is distinct from the first characteristic, the first characteristic and the second characteristic being characteristics relevant to the dispersion in the liquid droplet ejection amount among the plurality of nozzles;
the controller is configured such that the liquid droplet ejecting head is controlled to record a first nonuniformity correction pattern as the nonuniformity correction pattern, if the received characteristic signal indicates that the liquid droplet ejecting head has the first characteristic; and
the controller is configured such that the liquid droplet ejecting head is controlled to record a second nonuniformity correction pattern which is distinct from the first nonuniformity correction pattern, if the received characteristic signal indicates that the liquid droplet ejecting head has the second characteristic.

15. The liquid droplet ejecting apparatus according to claim 14, wherein:
the first characteristic is such a characteristic that the liquid droplet ejection amount from the plurality of nozzles is gradually decreased or gradually increased at positions separated farther from the first nozzle to approach the second nozzle when the liquid droplet ejecting head is driven by an identical signal in relation to the plurality of nozzles; and
the second characteristic is such a characteristic that the liquid droplet ejection amount from the nozzle which is included in the plurality of nozzles and which is arranged at a center in the first direction is increased as compared with the liquid droplet ejection amount from the first nozzle and the second nozzle or decreased as compared with the liquid droplet ejection amount from the first nozzle and the second nozzle when the liquid droplet ejecting head is driven by an identical signal in relation to the plurality of nozzles.

16. The liquid droplet ejecting apparatus according to claim 15, wherein the controller is configured such that:
the liquid droplet ejecting head is controlled to eject the liquid droplets from the first nozzle group composed of some of the nozzles which are included in the nozzle array, which include the first nozzle, and which are continuously aligned in the first direction when the first pattern group is recorded; and
the liquid droplet ejecting head is controlled to eject the liquid droplets from the second nozzle group composed of some of the nozzles which are included in the nozzle array, which include the second nozzle, and which are continuously aligned in the first direction when the second pattern group is recorded;
on condition that the received characteristic signal indicates that the liquid droplet ejecting head has the second characteristic;
the first nonuniformity correction pattern is recorded by controlling the liquid droplet ejecting head and the relative movement mechanism before recording the second nonuniformity correction pattern;
information of a density optimum position is acquired, the density optimum position being a position in the second direction of the first pattern portion and the second pattern portion which have the smallest density difference and which are adjacent to one another in the first direction, on the basis of the recording result of the first nonuniformity correction pattern;
information of an apex position is acquired, the apex position being a position in the first direction of a portion at which the density arrives at an apex in relation to the first pattern portion and the second pattern portion, on the basis of the recording result of the first nonuniformity correction pattern; and
the liquid droplet ejecting head and the relative movement mechanism are controlled to record the second nonuniformity correction pattern on the basis of the information of the density optimum position and the information of the apex position;
the controller is configured, in order to record the second nonuniformity correction pattern, such that;
a third pattern group, which is a part of the second nonuniformity correction pattern and which is composed of a plurality of third pattern portions aligned in the second direction, is recorded by controlling the liquid droplet ejecting head to eject the liquid droplets from the first nozzle group;
the relative movement mechanism is controlled to relatively move the liquid droplet ejecting head and the recording medium by a predetermined distance in the first direction;
a fourth pattern group, which is a part of the second nonuniformity correction pattern and which is composed of a plurality of fourth pattern portions aligned in the second direction and including portions recorded by the second nozzle aligned adjacently to portions recorded by the first nozzle of the plurality of third pattern portions in the first direction, is recorded by controlling the liquid droplet ejecting head to eject the liquid droplets from the second nozzle group;
the third pattern group includes a reference third pattern portion which is positioned between the third pattern portion disposed at one outermost end and the third pattern portion disposed at the other outermost end in the second direction; and
the fourth pattern group includes a reference fourth pattern portion which is positioned between the fourth pattern portion disposed at one outermost end and the fourth pattern portion disposed at the other outermost end in the second direction; and
the controller is configured, in order to record the third pattern group and the fourth pattern group, such that:
the plurality of third pattern portions and the plurality of fourth pattern portions are recorded by performing at least one correction of correction to decrease the liquid droplet ejection amount from the first nozzle group and correction to increase the liquid droplet ejection amount from the second nozzle group when the density optimum position is positioned farther from the first pattern portion disposed at the outermost end on the other side in the second direction and the second pattern portion disposed at the outermost end on the other side in the second direction as compared with the reference first pattern portion and the reference second pattern portion;

the plurality of third pattern portions and the plurality of fourth pattern portions are recorded by performing at least one correction of correction to decrease the liquid droplet ejection amount from the second nozzle group and correction to increase the liquid droplet ejection amount from the first nozzle group when the density optimum position is positioned farther from the first pattern portion disposed at the outermost end on one side in the second direction and the second pattern portion disposed at the outermost end on one side in the second direction as compared with the reference first pattern portion and the reference second pattern portion;

the density at the apex position of the third pattern portion is more thinned when the third pattern portion is positioned farther from the third pattern portion disposed at the outermost end on the other side in the second direction, when the third pattern portion, which is positioned farther from the third pattern portion disposed at the outermost end on the other side in the second direction as compared with the reference third pattern portion, is recorded;

the density at the apex position of the third pattern portion is more thickened when the third pattern portion is positioned farther from the third pattern portion disposed at the outermost end on one side in the second direction, when the third pattern portion, which is positioned farther from the third pattern portion disposed at the outermost end on one side in the second direction as compared with the reference third pattern portion, is recorded;

the density at the apex position of the fourth pattern portion is more thinned when the fourth pattern portion is positioned farther from the fourth pattern portion disposed at the outermost end on the other side in the second direction, when the fourth pattern portion, which is positioned farther from the fourth pattern portion disposed at the outermost end on the other side in the second direction as compared with the reference fourth pattern portion, is recorded; and the density at the apex position of the fourth pattern portion is more thickened when the fourth pattern portion is positioned farther from the fourth pattern portion disposed at the outermost end on one side in the second direction, when the fourth pattern portion, which is positioned farther from the fourth pattern portion disposed at the outermost end on one side in the second direction as compared with the reference fourth pattern portion, is recorded.

17. The liquid droplet ejecting apparatus according to claim 1, further comprising:
a liquid tank which is connected to the liquid droplet ejecting head; and
a purge mechanism which performs purge to discharge any liquid contained in the liquid droplet ejecting head from the plurality of nozzles, wherein:
the liquid droplet ejecting head is filled with a preserving liquid which is distinct from the liquid to be ejected from the plurality of nozzles, when the liquid droplet ejecting apparatus is produced, and the controller is configured such that:
the purge mechanism is allowed to perform the purge before recording the nonuniformity correction pattern upon initial use of the liquid droplet ejecting apparatus such that the preserving liquid contained in the liquid droplet ejecting head is thereby discharged, and the liquid to be ejected from the nozzles is introduced from the liquid tank.

18. A liquid droplet ejecting apparatus comprising:
a liquid droplet ejecting head which has a nozzle array composed of a plurality of nozzles aligned in a first direction;
a relative movement mechanism which is configured to relatively move the liquid droplet ejecting head and a recording medium in the first direction; and
a controller,
wherein the controller is configured to record, on the recording medium, a nonuniformity correction pattern in order to correct any dispersion in liquid droplet ejection amount among the plurality of nozzles, by controlling the liquid droplet ejecting head and the relative movement mechanism;
in a case of recording the nonuniformity correction pattern, the controller is configured to:
control the liquid droplet ejecting head to eject liquid droplets from at least a first nozzle to thereby record a first pattern group which is composed of a plurality of first pattern portions aligned in a second direction intersecting with the first direction, the first nozzle being an outermost end nozzle disposed on one side in the first direction of the nozzle array, the first pattern group being a part of the nonuniformity correction pattern,
control the relative movement mechanism to relatively move the liquid droplet ejecting head and the recording medium in the first direction by a predetermined distance; and
control the liquid droplet ejecting head to eject the liquid droplets from at least a second nozzle to thereby record a second pattern group which is composed of a plurality of second pattern portions aligned in the second direction, the second nozzle being an outermost end nozzle disposed on the other side in the first direction of the nozzle array, the second pattern group being a part of the nonuniformity correction pattern,
portions, which are recorded by the second nozzle and included in the plurality of second pattern portions, are adjacent in the first direction to portions, which are recorded by the first nozzle and included in the plurality of first pattern portions,
the first pattern group includes a reference first pattern portion which is positioned between the first pattern portion disposed at an outermost end on one side in the second direction and the first pattern portion disposed at another outermost end on the other side in the second direction,
the second pattern group includes a reference second pattern portion which is positioned between the second pattern portion disposed at an outermost end on one side in the second direction and the second pattern portion disposed at another outermost end on the other side in the second direction, the reference second pattern portion being adjacent to the reference first pattern portion in the first direction, in a case of recording the first pattern group, the controller is configured to control the liquid droplet ejecting head such that the first pattern portion disposed at the outermost end on one side in the second direction has a density which is thickened as compared with a density of the reference first pattern portion, and in a case of recording the second pattern group, the controller is configured to control the liquid droplet ejecting head such that the second pattern portion disposed at the outermost end on the other side in the second direction has a density which is thickened as compared with a density of the reference second pattern portion.

19. A liquid droplet ejecting apparatus comprising:
a liquid droplet ejecting head which has a plurality of nozzles aligned in a first direction;
a relative movement mechanism which is configured to relatively move the liquid droplet ejecting head and a recording medium in the first direction; and
a controller,
wherein the controller is configured to record, on the recording medium, a nonuniformity correction pattern in order to correct any dispersion in liquid droplet ejection amount among the plurality of nozzles, by controlling the liquid droplet ejecting head and the relative movement mechanism,
the controller is configured to receive a characteristic signal which indicates whether the liquid droplet ejecting head has a first characteristic or a second characteristic different from the first characteristic, the first characteristic and the second characteristic being characteristics relevant to the dispersion in the liquid droplet ejection amount among the plurality of nozzles, and in a case of recording the nonuniformity correction pattern on the recording medium, the controller is configured to:
control the liquid droplet ejecting head and the relative movement mechanism to record a first nonuniformity correction pattern on the recording medium, if the received characteristic signal indicates that the liquid droplet ejecting head has the first characteristic; and
control the liquid droplet ejecting head and the relative movement mechanism to record a second nonuniformity correction pattern different from the first nonuniformity correction pattern on the recording medium, if the received characteristic signal indicates that the liquid droplet ejecting head has the second characteristic, the first nonuniformity correction pattern is the nonuniformity correction pattern for correcting the dispersion in the liquid droplet ejection amount among the plurality of nozzles in relation to the liquid droplet ejecting head having the first characteristic; and the second nonuniformity correction pattern is the nonuniformity correction pattern for correcting the dispersion in the liquid droplet ejection amount among the plurality of nozzles in relation to the liquid droplet ejecting head having the second characteristic.

* * * * *